United States Patent
de Lind van Wijngaarden et al.

(10) Patent No.: US 9,374,787 B2
(45) Date of Patent: Jun. 21, 2016

(54) METHOD AND APPARATUS OF SMART POWER MANAGEMENT FOR MOBILE COMMUNICATION TERMINALS USING POWER THRESHOLDS

(75) Inventors: Adriaan J. de Lind van Wijngaarden, New Providence, NJ (US); Nachi K. Nithi, Wayne, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 769 days.

(21) Appl. No.: 13/024,728

(22) Filed: Feb. 10, 2011

(65) Prior Publication Data
US 2012/0210325 A1    Aug. 16, 2012

(51) Int. Cl.
*G06F 9/46* (2006.01)
*H04W 52/02* (2009.01)
*G06F 1/32* (2006.01)

(52) U.S. Cl.
CPC .......... *H04W 52/0258* (2013.01); *G06F 1/3206* (2013.01); *G06F 1/329* (2013.01); *H04W 52/0264* (2013.01); *Y02B 60/144* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 5,870,685 | A * | 2/1999 | Flynn | 455/573 |
| 6,889,330 | B2 * | 5/2005 | Chauvel et al. | 713/300 |
| 7,036,034 | B2 * | 4/2006 | Kobayashi et al. | 713/340 |
| 7,583,951 | B2 * | 9/2009 | Gibbs | 455/343.5 |
| 2005/0097376 | A1 * | 5/2005 | Weinberger et al. | 713/320 |
| 2005/0125701 | A1 * | 6/2005 | Hensbergen et al. | 713/320 |

(Continued)

FOREIGN PATENT DOCUMENTS

| | | |
|---|---|---|
| GB | 2 433 612 A | 6/2007 |
| JP | 2003008738 A | 1/2003 |

(Continued)

OTHER PUBLICATIONS

Amin Vahdat, et. al., "Every Joule is Precious: The Case for Revisiting Operating System Design for Energy Efficiency", Department of Computer Science, Duke University, Durham, NC, Proc. EW 9, Proc. 9th Workshop on ACM SIGOPS, ACM, New York, 2000, 6 pages.

(Continued)

*Primary Examiner* — Emerson Puente
*Assistant Examiner* — Mehran Kamran
(74) *Attorney, Agent, or Firm* — Chiesa Shahinian & Giantomasi, PC

(57) ABSTRACT

A method is provided for use in a mobile communication terminal configured to support a plurality of applications, wherein each application is executed by performing one or more tasks. The method includes, in response to a scheduling request from an application, obtaining an indication of power supply condition at a requested run-time of at least one of the tasks. The method further includes obtaining a prediction of a rate of energy usage by the task at the requested run-time, estimating, from the predicted rate of energy usage, a total amount of energy needed to complete the task, and making a scheduling decision for the task. The scheduling decision comprises making a selection from a group of two or more alternative dispositions for the task. The selection is made according to a criterion that relates the run-time power-supply condition to the predicted rate of energy usage by the task and to the estimate of total energy needed to complete the task.

18 Claims, 11 Drawing Sheets

(56) References Cited

U.S. PATENT DOCUMENTS

| | | | |
|---|---|---|---|
| 2007/0243852 A1* | 10/2007 | Gibbs | 455/343.5 |
| 2007/0245163 A1* | 10/2007 | Lu et al. | 713/300 |
| 2008/0005599 A1* | 1/2008 | Theocharous et al. | 713/300 |
| 2008/0263375 A1* | 10/2008 | Sundstrom et al. | 713/320 |
| 2009/0125293 A1* | 5/2009 | Lefurgy et al. | 703/18 |
| 2010/0145643 A1* | 6/2010 | Katpelly et al. | 702/63 |
| 2010/0313270 A1* | 12/2010 | Kim et al. | 726/24 |
| 2010/0332043 A1* | 12/2010 | Weyland | 700/291 |
| 2011/0271283 A1* | 11/2011 | Bell et al. | 718/102 |
| 2012/0005490 A1* | 1/2012 | Goraczko et al. | 713/300 |
| 2012/0130660 A1* | 5/2012 | Neumeyer | 702/63 |
| 2012/0215369 A1* | 8/2012 | Desai et al. | 700/291 |
| 2013/0158892 A1* | 6/2013 | Heron et al. | 702/34 |

FOREIGN PATENT DOCUMENTS

| | | | |
|---|---|---|---|
| JP | 2005242631 A | | 9/2005 |
| JP | 2009130860 A | | 6/2009 |
| KR | 10-2010-0092977 A | | 8/2010 |
| WO | 2009081293 A | | 7/2009 |
| WO | 2012/024641 A2 | | 2/2012 |
| WO | PCT/US2012/022335 | | 4/2012 |

OTHER PUBLICATIONS

Heng Zeng, et. al., "ECOSystem: Managing Energy as a First Class Operating System Resource", Department of Computer Science, Duke University, Technical Report CS-2001-01, Mar. 25, 2001; revised Aug. 8, 2001, 14 pages.

Heng Zeng, et. al., "Currentcy: Unifying Policies for Resource Management", Department of Computer Science, Duke University, ATEC '03, Proc. USENIX Annual Tech. Conf., USENIX Assoc., Berkeley, CA, 2003, 14 pages.

Daniel Grobe Sachs, et. al., "GRACE: A Hierarchical Adaptation Framework for Saving Energy", Electrical and Computer Engineering, Department of Computer Science, University of Illinois at Urbana-Champaign, Computer Science, University of Illinois Technical Report UIUCDCS-R-2004-2409, Feb. 2004, 9 pages.

R. Casas, et.al., "Battery Sensing for Energy-Aware System Design," IEEE Comput., 38:11 (2005), 48-54.

P. Chowdhury, et.al., "Static Task-Scheduling Algorithms for Battery-Powered DVS Systems," IEEE Trans. Very Large Scale Integration (VLSI) Sust., 13:2 (2005), 226-237.

M. Garrett, "Powering Down," Commun. ACM, 51:9 (2008), 43-46.

M. R. Jongerden, et.al., "Which Battery Model to Use?," IET Software, 3:6 (2009), 445-457.

N.S. Kim, et.al., "Leakage Current: Moore's Law Meets Static Power," IEEE Comput., 36:12 (2003), 68-75.

R. Palit, et.al., "Modeling the Energy Cost of Applications on Portable Wireless Devices," Proc. 11th ACM Internat. Conf. on Modeling, Analysis, and Simulation of Wireless and Mobile Syst. (MSWiM'08) (Vancouver, BC, Can., 2008), pp. 346-353.

A. Sinha, et.al., "Energy Aware Software," Proc. 13th Internat. Conf on VLSI Design (VLSI Design '00) (Calcutta, Ind., 2000), pp. 50-55.

C. Xian, et.al., "A Programming Environment with Runtime Energy Characterization for Energy-Aware Applications," Proc. ACM/IEEE Internat. Symp. on Low Power Electron. and Design (ISLPED '07) (Portland, OR, 2007), pp. 141-146.

K. Pentikousis, "In Search of Energy-Efficient Mobile Networking," IEEE Commun. Mag, 48-1 (2010), 95-103.

R. Rao, et.al., "Battery Modeling for Energy-Aware System Design," IEEE Comput., 36:12 (2003), 77-87.

S. Park, et.al., "Dynamic Battery State Aware Approaches for Improving Battery Utilization," Proc. Internat. Conf. on Compilers, Architecture and Synthesis for Embedded Syst. (Cases '02) (Grenoble, Fra., 2002), pp. 225-231.

R. Rao, et.al., Battery Optimization vs. Energy Optimization: Which to Choose and When?, Proc. IEEE/ACM Internat. Conf. on Comput. Aided Design (ICCAD '05) (San Jose, CA 2005), pp. 435-445.

V. Rao, et.al., "Battery Aware Dynamic Scheduling for Periodic Task Graphs," Proc. 20th Internat. Parallel and Distrib. Process. Symp. (IPDPS '06) (Rhode Island, Grc., 2006).

P. Shenoy, et.al., "Proxy-Assisted Power Friendly Streaming to Mobile Devices", Proc. of the 2003 Multimedia Computing and Networking Conference.

M.C. Rosu, et.al., "PAWP: A Power-Aware Web Proxy for Wireless LAN Clients". IEEE Workshop on Mobile Computing Systems and Applications, 2004, pp. 206-215.

M.C. Rosu, et.al., "The Power—Aware Streaming Proxy Architecture" First Intl' Workshop on Broadband Wireless Multimedia 2004.

Hewlett-Packard/Intel/Microsoft/Phoenix/Toshiba, "Advanced Configuration and Power Interface Specification", Revision 4.0a, Apr. 5, 2010, 64 pages.

Notice of Preliminary Rejection mailed on Dec. 5, 2014, and received on Dec. 9, 2014, in connection with related Korean Patent Application No. 10-2013-7023594, 11 pgs.

Notice of Reason for Refusal issued on Jul. 3, 2014, for related Japanese patent application No. 2013-553452, 6 pgs.

\* cited by examiner

| IDENTIFIER |
|---|
| STATE |
| PRIORITY |
| PROGRAM COUNTER |
| MEMORY POINTERS |
| CONTEXT DATA |
| I/O STATUS INFORMATION |
| ACCOUNTING INFORMATION |
| POWER-RELATED FLAGS |
| POWER-RELATED INFORMATION |
| ⋮ |

METHOD AND APPARATUS OF SMART POWER MANAGEMENT FOR MOBILE COMMUNICATION TERMINALS USING POWER THRESHOLDS

CROSS-REFERENCE TO RELATED APPLICATIONS

The subject matter of this application is related to the subject matter of U.S. patent application Ser. No. 13/024,682, filed on Feb. 10, 2011 by A. J. de Lind van Wijngaarden and N. K. Nithi under the title, "Method and Apparatus of Smart Power Management for Mobile Communication Terminals," and assigned to the assignee hereof.

FIELD OF THE INVENTION

This invention relates to power management in mobile communication terminals.

ART BACKGROUND

Mobile terminals are rapidly evolving from a simple phone with a camera to a powerful, multifunctional device, equipped with powerful processors, a large amount of memory, a high-resolution camera, multiple sensors, and a large touch-sensitive specialized display. At the same time, mobile terminals have a small form factor, which puts limitations on the size and shape of the battery. Even though current mobile terminals have a powerful battery, their capability of simultaneously running various applications, including real-time applications such as online games and streaming video and audio, imposes considerable restrictions on the amount of time that a mobile terminal can remain operational without recharging.

In the past, a mobile phone's performance was measured in terms of "talk time" and "standby" time between battery recharges, where the first measure indicates the total time a battery can power a mobile phone while it is used to perform calls, and the latter refers to the total time a battery can keep a phone operable. Additional performance parameters are currently being introduced to take into account the differences in power consumption per application, e.g., "Internet use time," "video playback time," and "audio playback time."

However, if multiple services are used simultaneously, battery power is likely to drain rapidly, which will make it difficult to predict just how quickly the mobile terminal will run out of power. If the battery power is low, the user may try to reduce power consumption by avoiding or only briefly using certain applications. However, for many applications, it may be hard for the user to estimate and control the mobile terminal's power consumption, and some applications and services may operate in the background, making them even less visible to the user. Starting applications without knowledge of the actual power remaining in the battery may cause the mobile terminal to launch a power-intensive application when there is not much power left, thus quickly draining the remaining power and leaving the terminal inoperable until it is recharged.

Mobile terminals use highly integrated, low-power chipsets. The power consumption in chipsets, and in particular in processors, is largely determined by the supply voltage V, the clock frequency f, the fraction of gates actively switched a, and the leakage current $I_l$. A processor's overall power consumption P is the sum of a dynamic power term and a static power loss term, and is generally modeled by $P=aCV^2f+VI_l$, where C denotes the capacitance load of the logic gates.

The processors used in mobile terminals typically have a very low static power loss. Large power savings can be obtained when the components are able to switch off internal modules when they are not in use. Processors may be designed to support dynamic frequency scaling, which provides a linear reduction of the dynamic power term. A quadratic reduction can be obtained if the supply voltage is dynamically adjustable. This is referred to as dynamic voltage scaling (DVS), which is one of the earliest approaches for power optimization. A lower supply voltage typically reduces the maximum achievable clock frequency, and therefore both the voltage and the clock frequency may be scaled down simultaneously to achieve significant power savings in exchange for computation speed.

Mobile terminals employ a wide variety of energy-saving strategies to limit power consumption, e.g., sleep modes and timers that switch the display to a low-intensity mode if it is inactive for a certain period of time. Some mobile terminals may provide an interface that allows the application to adjust the timers for low-intensity display. Mobile terminals typically use a battery charge status indicator and a reception-quality indicator to give the user an idea of the remaining power and the quality of the wireless connection, and they typically incorporate various sleep modes where parts of the system are switched off when there is no activity for a certain, pre-configured duration.

Larger mobile terminals such as laptops and notebooks typically have a power management function that warns the user when power is low. The power management function may take steps to save data so that an orderly shutdown of the system can be accomplished. The power management function may also switch off some functionality to conserve energy in sleep-mode.

The power management function is typically provided by the operating system. Laptop operating systems are typically desktop operating systems with two additional features: Wireless connectivity and user-controlled power saving features. Mobile operating systems, especially those used in multi-tasking smart phones, are often derived from the operating systems that are typically found in laptops.

The operating systems use task scheduling to maximize the utilization of the processor(s). In this context, we define a task to be the smallest unit which is scheduled for execution by the operating system. A process is an instance of a program that is executed to perform a designated job. A process may comprise one or more tasks that can be executed in any serial and/or parallel order. In some operating systems, a task is realized as a thread or a lightweight process.

In multi-tasking operating systems, tasks are assigned priorities for scheduling. Some tasks may be pre-empted to accommodate tasks with a higher priority. The goal of task scheduling in multi-tasking operating systems is to maximize the utilization of the processor(s). A wide variety of scheduling algorithms have been implemented in operating systems to achieve different performance criteria. In addition to processor utilization, other important criteria include fairness, throughput, turnaround time, waiting time and response time.

In battery-powered devices and computers where power consumption is critical, it is advantageous to consider power consumption as a further optimization criterion.

Power-aware algorithms for reducing energy use by applications have been proposed for use in mobile terminals. However, there remains a need for still greater awareness of actual power needs and actual capacity to deliver the needed power.

SUMMARY OF THE INVENTION

In illustrative embodiments, the task scheduling algorithms that are used in the mobile terminal are modified to take the actual power consumption of applications into account. This is done by using additional criteria such as the power remaining in the battery, the amount of power needed to complete a given task, the criticality of the task, and the location of the terminal. Some of the advantages that may flow from such a modification include:

Enabling a mobile terminal to determine whether an application started by the user, or a service initiated by the device, can be assured to run to completion with the remaining battery power;

guaranteeing that the mobile terminal can provide important functionality such as authentication, banking, emergency alerts, emergency calls, and certain location-based services for an extended period of time, such that the user can rely on the mobile terminal to perform these critical applications when needed;

enabling the network or the application server to help reduce energy consumption in the mobile terminal when power levels are very low; and providing a means for the operating system of a mobile terminal to control and manage the terminal's energy consumption so as to provide a better user experience, particularly when critical applications and services are executed.

Accordingly, in one embodiment a mobile communication terminal is configured to support a plurality of applications, wherein each application is executed by performing one or more tasks. In response to a scheduling request from an application, an operating system within the mobile terminal obtains an indication of the power supply condition at a requested run-time of at least one of the tasks. The operating system obtains a prediction of a rate of energy usage by the task at the requested run-time, and obtains, from the predicted rate of energy usage, an estimate of a total amount of energy needed to complete the task. The operating system makes a scheduling decision for the task. The scheduling decision comprises making a selection from a group of two or more alternative dispositions for the task. The selection is made according to a criterion that relates the run-time power-supply condition to the predicted rate of energy usage by the task and to the estimate of total energy needed to complete the task.

In another embodiment, a mobile communication terminal comprises a battery, a source of information about the condition of the battery, a module configured to obtain an indication of the battery condition from the battery information source in response to a request from an application to schedule a task, a source of information about the rates of energy usage by tasks associated with one or more applications, a module configured to obtain, from the energy-usage information source, a prediction of a rate of energy usage by the task at a requested run-time for the task and further configured to estimate a total amount of energy needed to complete the task, and a task-scheduling module configured to select from a group of two or more alternative dispositions for the task. The selection of a disposition for the task is made according to a criterion that relates the run-time battery condition to the predicted rate of energy usage by the task and to the estimate of total energy needed to complete the task.

In some embodiments, the operating system obtains a prediction of a rate of energy usage by the task at the requested run-time at least when the task is non-critical, but the feature that bases the scheduling decision on the predicted rate is not enabled if the task is critical. That is, the operating system makes a scheduling decision for the task. If the task is non-critical, the scheduling decision involves a criterion that relates the run-time power-supply condition to the predicted rate of energy usage by the task. If the task is critical, however, no such criterion is applied.

In another embodiment, in response to a scheduling request from an application, an operating system obtains an indication of remaining useful discharge capacity of the battery at a requested run-time of at least one of the tasks, obtains an indication of whether or not the task is critical, and makes or obtains a scheduling decision for the task. The making of a scheduling decision comprises selecting from a group of two or more alternative dispositions for the task including at least one disposition that results in the task being disallowed and at least one disposition that results in the task being executed. The selecting step is performed such that for indications that the remaining useful discharge capacity is within a specified range, a disposition that results in the task being executed is available if the task is indicated as critical, but is otherwise unavailable.

BRIEF DESCRIPTION OF THE DRAWINGS

FIG. 8B is a format diagram for an exemplary process control block as modified to include power-related data fields.

FIG. 9A relates to the operation of admission module 710 of FIG. 7; and

FIG. 9B relates to the operation of power-aware scheduling module 760 of FIG. 7.

DETAILED DESCRIPTION

Figure 1:
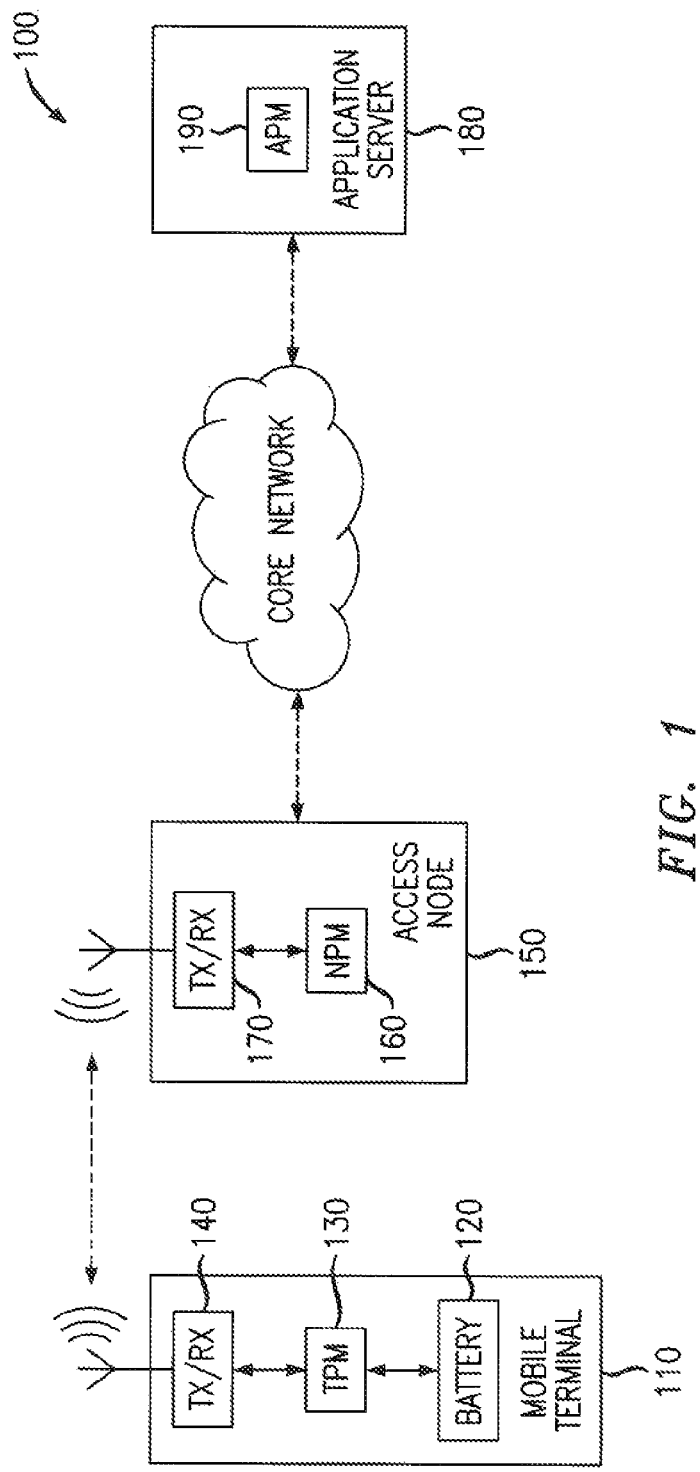
FIG. 1 is a schematic drawing of an illustrative wireless communication system in which an embodiment of an exemplary power-aware management scheme has been implemented.

Some mobile terminals incorporate known hardware components that have energy-saving features, e.g., a "smart" battery that provides crucial information to the hardware and the mobile terminal's operating system (OS), a display with adjustable brightness, and a wireless transceiver having energy-saving features. These components are typically controlled by the mobile terminal's OS, and some of these components are made available to the user(s) or user applications.

The primary goal of the OS-based power management architecture is to implement strategies that use energy efficiently, extend the useful lifetime of the batteries, and prolong device usage time between recharges.

One of the most important requirements for effective mobile terminal power management is awareness of the actual state of the battery. Mobile terminals are typically equipped with a pack of rechargeable batteries. There are known mechanisms to facilitate communication between the system and power management chips and the rest of the system. For example, the advantages of the smart bus interface specified in the Smart Battery System (SBS) standard have lead to its acceptance as a standard for accurately measuring steady-state battery parameters.

A smart battery monitoring system includes a smart battery, a system management bus interface, and a smart charger. The term "smart battery" refers to a pack of rechargeable batteries equipped with a micro-chip circuit that collects, calculates, and predicts battery parameters using, e.g., a proprietary battery model, and provides the computed parameters to the host system via software control. The smart battery has a built-in interface to communicate with the charger and the host system via the SMBus.

The SMBus is a two-wire communication interface specification for exchanging information between the smart battery, the host system, and the smart charger.

The smart charger communicates with the smart battery to retrieve the battery's current charge status for more precise control over the charging time. The smart battery typically provides several parameters that describe the battery state, in particular the state of charge (SoC) and the state of health (SoH) parameters. The SoC is the current charge level of the battery measured as a percentage of its total capacity. The SoH is a measure of the battery's ability, relative to a new battery of the same type, to deliver the specified output power.

Via a call to SMBus interface functions, the host system can obtain the battery's model, type, SoC, SoH, temperature, and other usage statistics such as the number of charge/discharge cycles, the age of the battery, the time to empty, and the time to charge. The data obtained through the SMBus can be used for developing power management applications in the host system.

It should be noted that the SMBus interface is one of various possible interfaces that may be useful in this context.

Power management in mobile operating systems consists of an OS-side component and, optionally, user-side add-on applications. Power management implementations on the kernel-side typically use an interface to read or measure the battery charge status and other battery-related parameters, and they typically use built-in functions to control the power supply to various hardware subsystem components.

In addition to controlling the processor(s), the operating systems control power to various hardware subsystems such as the liquid crystal display (LCD), keyboard, disk drives, memory modules, communications modules, sensors, camera, audio devices and the like. For monitoring the battery status, the operating system may implement a battery model and discharge profile, and it may utilize SMBus interfaces to read battery parameters.

Built-in OS-side power management functions typically provide handles through which device drivers and applications are notified when the battery's status changes. In addition to the battery status notification, the device drivers may set timers to decide when to switch to various power conserving modes (e.g., off, idle, sleep, low power, or active modes).

On the user side, high-level add-on applications can be deployed to give users control over the power used by other user-facing applications and by hardware subsystem components. Whereas the control offered by some of such add-on applications is fully manual, others offer profile-based scheduling under which applications may be turned on or off on the occurrence of contingencies specified in a user-defined profile. By defining the application profile in a manner that is sensitive to power consumption, the user can indirectly provide some automatic control over the power consumption.

The principles to be described here can be combined into an approach that we refer to as smart power management. Smart power management is a power-aware task management scheme that integrates power monitoring and task scheduling activities in at least the mobile terminals. In some implementations, it may be a comprehensive, network-wide scheme that also integrates power monitoring and task scheduling activities in the network nodes. Such a scheme may replace existing power management schemes, or alternatively, it may be implemented as a complementary approach for extending the power management in mobile operating systems.

One of the advantages of our approach is that it need not be limited to real-time applications with strict deadlines. For at least some power management schemes, this has been a significant limitation because smart phone tasks are neither cyclic, nor do they arrive at periodic intervals. Furthermore, because multi-tasking smart phones can host different types of applications, tasks may have unpredictable arrival times and for some applications, it may be difficult to predict how long sessions will persist. For example, if the user plays a video game over the Internet or starts a live streaming show, the session may be prolonged for an unpredictable duration.

Another advantage of our approach is that when used to optimize computing resources, it need not be limited to using battery power as the sole constraint. Indeed, it is desirable for task scheduling in smart phones to consider not only the battery power but also other constraints such as the radio resources (available bandwidth) and the criticality of the job. It should also be noted that smart phones are expected to support life-critical applications such as emergency calls, and services such as banking transactions. Thus, the task scheduler in mobile terminals would preferably take these constraints into account.

In mobile handsets, the hardware components of radio links (radio modems) typically consume much more power than other hardware components. The amount of power spent to maintain a reliable link is further influenced by the location of the handset. For example, a handset that is farther away from a cell tower must typically use a higher transmission power than a handset that is in the direct vicinity of a cell tower. In addition, handsets that are in a roaming zone may try to establish a link by frequently searching for signals and this may drain power rapidly. Thus, the location of the handset can influence the amount of power that an application may consume, and hence the power-aware scheduling of those tasks. Therefore, it would be advantageous to provide a scheduling algorithm that can consider the location of the handset.

Another advantageous feature for a scheduling algorithm would be the ability to adapt to switching between power sources of different kinds. Conventionally, it is typical to assume that either an exhaustible source such as a battery is being used, or else an inexhaustible source, e.g., a charger or wall outlet, is being used. In practice, however, mobile terminals are frequently switched between the battery and a charger or wall outlet. It is desirable for the task scheduling algorithm to recognize switching between power sources and to adapt its scheduling strategies accordingly. It is noteworthy in this regard that the use of newer types of power sources, such as micro-dynamos and solar cells, is advantageously managed in a power-aware manner, since such sources may, e.g., provide just enough power to make a critical call.

Another advantageous feature for a scheduling algorithm is freedom from the typical assumption that each task will consume an amount of current that is constant and known a priori. In at least some cases, it might not be feasible to predict the total current that a task will consume because the duration of the task is unpredictable.

Typical mobile operating systems will permit the power to various hardware subsystems to be controlled selectively via device drivers. Because tasks will rarely use all of the hardware systems all of the time, it is advantageous if the actual power consumed is re-computed at different points during the entire execution of the task. Thus, task scheduling algorithms will advantageously take the variability of power consumption into account by recomputing the power consumption during each scheduling phase.

Accordingly, an exemplary power-aware management scheme uses a power-aware task manager in the mobile terminal that manages applications according to their power needs. In preferred embodiments, this exemplary scheme also enforces a power reserve, i.e., a specified amount of discharge capacity that is withheld from use by non-critical applications, to ensure the availability of critical services. Network-based and application-based power managers may be used to help reduce the power consumption in the mobile terminals. Similar principles may also be used to defer the execution even of non-critical system tasks when the remaining discharge capacity is low. It will be understood in this regard that the operating system may treat certain system tasks, i.e., tasks whose operation is limited to the processor, as "critical". However, unless we state otherwise, the "criticality" referred to in the following discussion applies to user applications, and not to system tasks.

FIG. 1 is a schematic drawing of a wireless communication system 100 in which an embodiment of an exemplary power-aware management scheme has been implemented. In the figure, we have included power-aware elements not only in the mobile terminal, but also at other network nodes. The use of power-aware elements outside of the mobile terminal should not be regarded as an essential element of our invention, although it will be advantageous in some embodiments of the invention. We have included such elements in FIG. 1, not for purposes of limitation, but rather to illustrate the breadth and flexibility of our approach.

As shown in the figure, mobile terminal 110 includes a battery power supply 120, a terminal-based power manager (TPM) 130, and a transceiver unit 140. Access node 150 includes a network-based power manager (NPM) 160 and a transceiver unit 170. Elsewhere within the network, application server 180 includes an application-based power manager (APM) 190. Application server 180 will typically lie outside the wireless network but will be in communication with it. NPMs may work in concert with the TPMs in the mobile terminals to support network-wide power-aware scheduling activities. An APM may take over some of the application processing normally performed within the mobile terminal upon an indication of low battery power in the mobile terminal. Such a strategy may be especially useful, for example, in regard to an application that is very computationally intensive. In such cases, the energy saved by shifting the computational burden to a network entity may exceed, by a significant margin, the extra energy expended in communication between the mobile terminal and the network entity.

As will be seen below, an exemplary TPM module in the mobile terminal includes a power-aware monitoring module to estimate the actual power supply capabilities. It also includes a power-aware task scheduler for estimating the power consumption necessary for each task, and subsequently, for disposing of each task by scheduling it, monitoring it, suspending it, or terminating it. The detailed architecture for an exemplary TPM module is shown in the schematic block diagram of FIG. 2.

Figure 2:
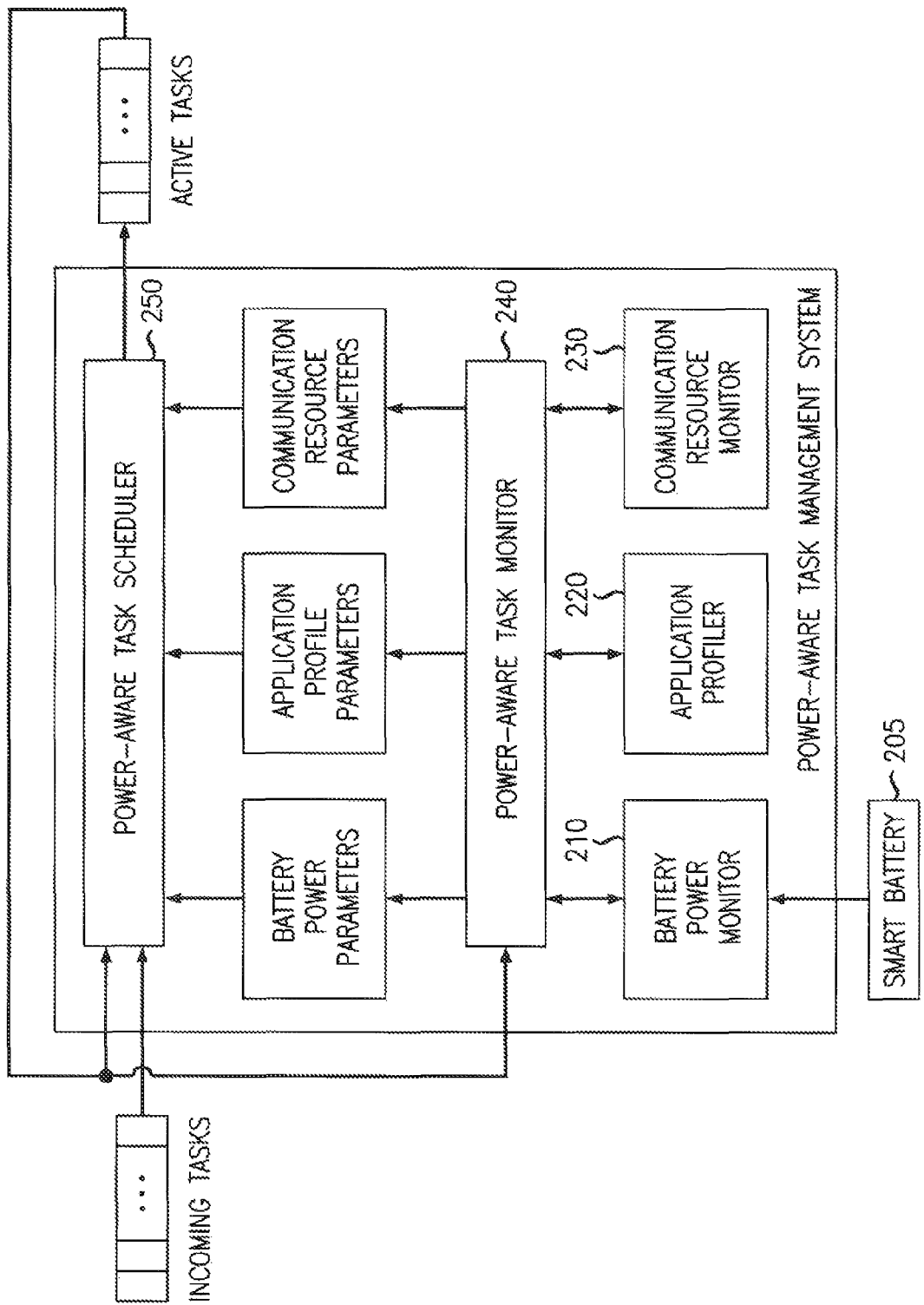
FIG. 2 is a schematic block diagram illustrating the detailed architecture for an exemplary terminal-based power manager.

A TPM module such as that shown in FIG. 2 is advantageously made part of the mobile terminal's operating system. The TPM module of FIG. 2, which is identified in the figure as a power-aware task management system, includes the following components:

Battery power monitor 210 computes the ability of battery 205 to supply the estimated power needed to perform a given task, based on the current state-of-health (SoH) of the battery and its charge level. Monitor 210 is advantageously a smart power monitor, and battery 205 is advantageously a smart battery (as shown in the figure).

Application profiler 220 contains profiles for each application, or at least for categories of applications. The data in an application profile may include, for example, the type of application, its priority class, its typical execution time, the usage history of the application, and long-term usage patterns of the application. The priority class may be, for example, a user-specified classification as "critical" or "non-critical". Other priority classifications may define a hierarchy of two or more different levels depending on the relative importance of the application.

As will be seen, selection criteria for operation when available power is low may be more permissive for "critical" than for "non-critical" tasks and applications. Similarly, the application profile may include a user-configured indication to override at least some power-aware selection criteria.

Communication resource monitor 230 monitors the communication link status and related metrics.

Power-aware task monitor 240 monitors long-running applications. Task monitor 240 updates the measurements of power usage by the long-running applications, and it calculates various threshold parameters for use by the power-aware task scheduler (described below). Task monitor 240 also collects statistics about applications and their usage patterns.

Power-aware task scheduler 250 schedules tasks. Each task is scheduled based on the estimated power required to complete the task, the profile of the task, and the availability of communication resources and other required resources.

The five components 210-250 will run, e.g., as software modules within the mobile operating system. The power-aware task monitor and the power-aware task scheduler may be implemented either as an enhancement to an existing task scheduling module or as an additional scheduling module.

The battery power monitor can be implemented as an additional software module that utilizes the smart battery API by, for example, receiving input from the smart battery and processing it. If there is no smart battery, then a suitable battery model is advantageously implemented as part of this module.

The communication resource monitor module can be implemented as a software module. This module may have to interact with communication hardware to get inputs such as signal strength, channel quality, and bandwidth. This module may interact with a GPS receiver or other software modules to get location information that can be used to determine the wireless network coverage area.

The application profiler module can be implemented as a software module with its own application profile database.

The various software modules discussed here can all run on, e.g., a central digital processor that forms the computational heart of the mobile terminal, or on an auxiliary processor that operates in conjunction with the central processor. Digital memory devices can be used for storage of data needed by the software modules, as discussed below.

The monitoring components 210-240 may run as one or more independent system processes. As such, they would run in the background. They would periodically obtain the pertinent parameters and write them to memory locations that can be accessed by scheduler 250, and that are associated with the respective parameters used in the operation of the power-aware modules.

The five components 210-250 are discussed in more detail below.

The battery power monitor tracks the mobile terminal's battery status and aids in maximizing the battery life. Maximizing the life of the battery is an important design criterion for mobile handsets. That is, batteries exhibit nonlinear behavior during individual discharge cycles. Nonlinear behavior is also observed in the storage efficiency throughout the battery lifecycle. Batteries tend to deliver a less robust charge after each subsequent charge cycle because of irreversible physical and chemical changes.

In order to provide a satisfactory user experience, it is desirable for mobile operating systems to take the non-linear behavior of the battery into consideration in the scheduling of user applications and services. Because the start time and run-time of individual applications (and services) are often impossible to determine in advance, it is advantageous for task scheduling algorithms to take at least the battery status into consideration. The scheduling problem in smart phones is even more complex because such phones often support a true multi-tasking environment similar to that of desktop computers.

The nonlinear behavior of the battery will also affect the design of power-aware applications and services since all are desirably optimized with respect to battery power status.

Figure 3:
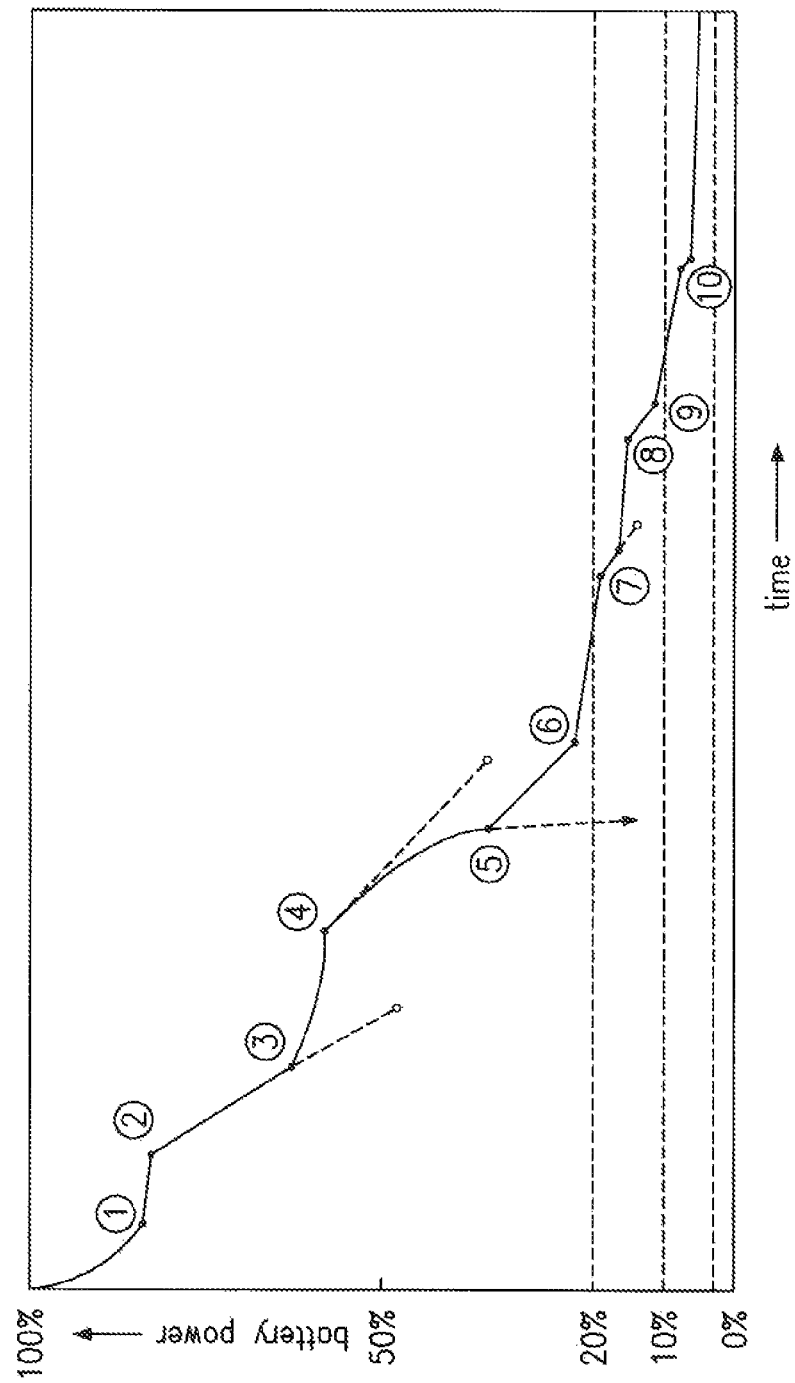
FIG. 3 is a plot of battery capacity versus time for a hypothetical battery, illustrating the general shape of discharge patterns for typical batteries used in mobile terminals. In particular, the figure illustrates typical discharge behavior when applications of several kinds are started and terminated.

FIG. 3 is a plot of battery capacity versus time for a hypothetical battery, illustrating the general shape of discharge patterns for typical batteries used in mobile terminals. The vertical axis represents the remaining charge on the battery that is available for utilization as a percentage of the usable charge that is available initially. This is an aspect of the state-of-health (SoH) of the battery. Also indicated in the plot are a horizontal line marking the 20% level of remaining capacity, and a second horizontal line marking the 10% level of remaining capacity. A further horizontal line, representing a battery exhaustion threshold, is also indicated at a very low level, e.g., at 3% of the remaining capacity. The reference numerals 1 through 10 indicate various events that have significance for the discharge pattern.

Turning to FIG. 3, it will be seen that a fully charged battery experiences a typical discharge due to an application that runs from the initial time until the application terminates at event 1.

After some period of inactivity, a second application, possibly a video application, is started at event 2. The broken line extending past the event marked 3 represents an estimate of the power required to complete the task, as determined by the power-aware task manager. The scheduler determines that in this instance, the task can be admitted for scheduling because even after the expected maximum duration, there will be sufficient power. The second application runs until it terminates at event 3.

After some further inactivity, a third application is started at event 4. Initially, the power-aware task scheduler again determines that there will be sufficient power, and the task can therefore be scheduled. However, the smart power monitor soon discovers that due to deteriorating channel conditions, the power consumption is much higher. For example, the mobile terminal may have moved into a partial radio shadow where sufficient bandwidth is still available, but only at the cost of much more power.

At event 5, the rate of power consumption has grown so high that the power-aware task scheduler has issued a message warning the user to terminate or suspend the application.

Between events 5 and 6, an application having lower power consumption has been admitted and permitted to run, followed by a period of inactivity from event 6 to event 7. By event 7, the remaining capacity has dropped below the 20% threshold. As will be discussed below, such a threshold may be used to indicate a region in which only selected applications are admitted for scheduling. Examples may include applications that consume very little energy and semi-critical applications. As illustrated in the figure, an application is admitted at event 7 because it has a very short expected duration, so that the task is expected to run to completion without depleting the battery. After a short period of inactivity, another short-duration task is admitted at event 8 and runs until event 9.

It should be noted in this regard that even during a period of inactivity, some power is lost if the user terminal is switched on. During inactivity, the power loss is typically greatest when the battery is fully charged. When the battery is low, it may in at least some cases be advantageous to shed some of the power-consuming background tasks and even system tasks, to conserve energy. The power-aware modules can be used to at least partly direct such a process.

Shortly after event 9, during a period of inactivity, the remaining capacity falls below the 10% threshold. Below this threshold, only critical applications are permitted to run. Such an application is started at event 10. Optionally, new applications may be denied, and active critical applications may be gracefully terminated, below the battery exhaustion threshold.

There are known battery modeling algorithms that take into consideration the non-linear characteristics of the batteries and the shapes of their discharge profiles. Such algorithms may use either an analytical model or a detailed physical model of electrochemical processes to simulate the behavior of the battery. Some known algorithms adjust the battery cycle using further heuristics such as recovery insertion periods, load profiles, unpredictable user-enforced rest periods, recharging durations, and task granularity.

The figure shows selection criteria being applied to tasks at exemplary thresholds of 20% and 10% of the available power. In fact, different thresholds may be established for different tasks, applications, or classes of tasks or applications. In addition, the user may configure an override flag when prompted that the power is getting low, or at an earlier time. As noted below, an override may even be configured so that the mobile terminal will start up in a mode in which the power-aware features are disabled. By "disabled" is meant any condition in which the power-aware features are not effective or not invoked. Various other, intermediate configurations are of course also possible and are not excluded.

The override flag may cause the task to which it applies to be scheduled for execution irrespective of the available power level. Alternatively, the override flag may permit the scheduling to be subject to a low-power threshold, but may disconnect the scheduling decision from any consideration of the projected power consumption of the task.

It should be noted that selection criteria based on available power may be applied both to newly arrived tasks and to tasks that have been admitted and that may be in a second or subsequent iteration of the processing loop. Accordingly, a task in progress may be terminated at any time that the pertinent selection criterion ceases to be satisfied.

Figure 4:
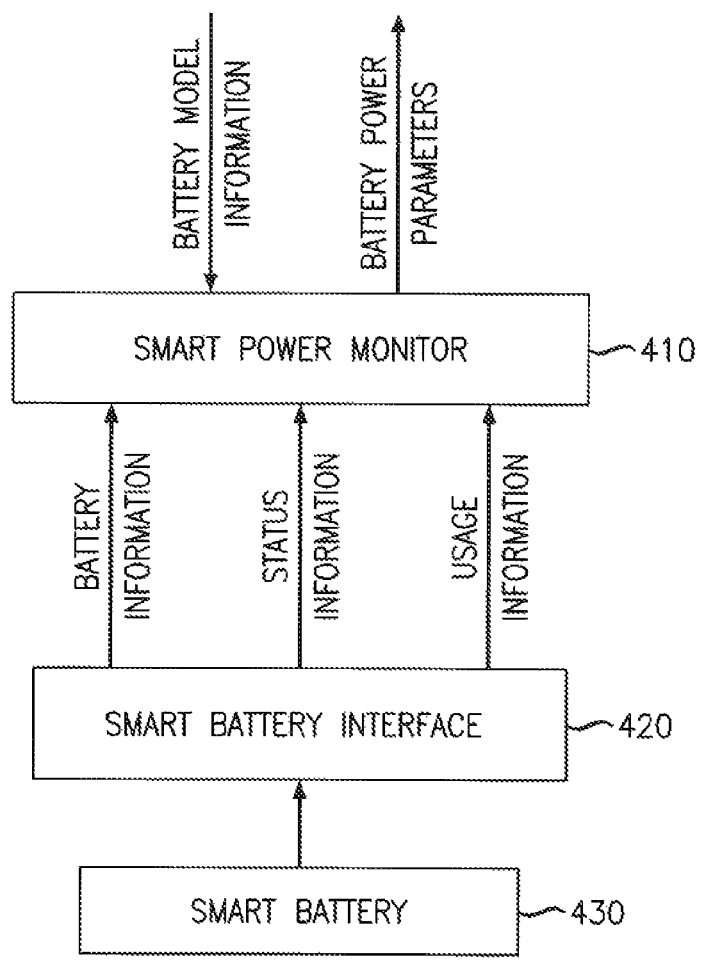
FIG. 4 is a functional block diagram of the power system in a mobile terminal according to an embodiment of an exemplary power-aware management scheme.

FIG. 4 is a functional block diagram of the power system in a mobile terminal according to one embodiment. As shown in the figure, smart power monitor module 410 is a high-level application programming interface (API) layer that interfaces with SMBus battery API 420 of smart battery 430. Module 410 extracts information including:

Battery type and model, which is useful to fine-tune the power control algorithms for specific battery models.

Power source, which identifies whether power is being drawn directly from the battery, or from another source such as a charger, transformer, wall outlet, or universal serial bus (USB).

Status information, which may include, by way of example and without limitation, the charge level, the state of health of the battery, and the power supply time. These parameters are discussed below.

Usage parameters, such as the age of the battery, and the cumulative number of charge cycles up to the present time.

Specific examples of status information are:

Charge level, i.e., the State of Charge (SoC), which indicates the current charge level of the battery. The charge level will typically be stated in milliampere-hours (mA-h), milliwatt-hours (mW-h) or the equivalent, together with an assumed constant rate of discharge expressed, e.g., in mA or mW;

State of Health (SoH) of the battery; and

Power supply time, indicating how long the battery will supply current and/or power at a given rate. The power supply time may be expressed, for example, in minutes.

The smart power monitor module can be implemented as a high level programming language interface (e.g., in C or in Java), possibly with the help of hardware modules to provide the necessary access to parameter values.

If the mobile terminal's battery does not have an SMBus interface, the calculation of SoC, SoH, and battery-related parameters can be accomplished with the help of a battery model and an estimator. Moreover, some smart batteries may not support all SMBus features. Thus, in the absence of an SMBus interface, implementation of a proper battery model is needed to support the power-aware task scheduling algorithms. It should be noted, however, that the battery model is not necessarily implemented in the mobile terminal. It could be implemented elsewhere in the network and made readily available for wireless communication with the mobile terminal.

When a battery model is incorporated, the smart power monitor will also include a database to store information such as the battery type, the battery's age, the number of times it has been recharged, and other parameters. The estimator takes the available information as an input and determines the battery's capabilities at any battery charge state. Thus, for example, the estimator may calculate a state-of-health parameter along with an estimate of remaining power.

Batteries have limited capacity, and they exhibit non-linear system dynamics. Therefore, it is not a straightforward matter to predict whether a battery can supply a load current sufficient for a given application over a required period of time. To be able to provide a useful estimate of the battery capacity, it is very desirable to have available not only the SoC value, but also the SoH value.

The SoC is a measured value and it can be obtained directly from the battery's SMBus or by using battery models. In the absence of a smart-battery interface, the SoC value may be obtained, for example, by a two-step process: First, relevant parameters such as voltage, current, and temperature are measured. Then, the SoC value is inferred from the collected parameters, from historical data, and from the previously established model.

It is disadvantageous, however, to rely on the SoC alone. That is, the SoC measure of a battery is useful only in indicating a battery's total charge; it does not reveal how much useable energy is left in the battery. In other words, the SoC value does not reflect how long a battery will support a required load.

The SoH, however, is not accessible to direct measurement, and for that reason it must be predicted using models that pertain to specific battery technologies. Over the years, several different models have been proposed and extensively studied to accurately predict a battery's SoH and to determine its SoC. These models are based on parameters whose values are affected by numerous factors such as discharge rate, history of charge-discharge cycles, and operating temperature. These models can be broadly classified into four categories:

Physical models simulate the physical processes occurring in the battery.

Empirical models fit parameters to model equations so as to match experimental data.

Abstract models represent the battery as electrical circuits, discrete-time equivalents, and stochastic processes.

Mixed models try to simplify physical processes by using empirical parameters.

Although physical models offer the greatest accuracy, physical modeling is computationally intensive and difficult to implement in mobile handsets. Empirical models may be computationally simple, but they may also lack sufficient accuracy. Therefore, our current belief is that analytical models are best suited for implementation in a mobile handset. As noted, more computationally intensive models may usefully be deployed in other parts of the network, where computational capacity is less constrained.

One analytical model that may be useful in this regard is the kinetic battery model (KiBaM). Such a model may be implemented, for example, in the mobile operating system. The model may be used to estimate relevant power parameters, and to further enhance the accuracy of the implemented model by collecting historical data on the handset battery with a software module. By using handset-specific battery data, it will be possible to recalibrate the model parameters for enhanced accuracy.

More simply, the battery model may be a table of data characterizing the condition expected, on average, for a battery of the pertinent type at various ages and at various points in its discharge cycle. A useful battery model of either the computational kind or the purely tabular kind may be stored in a local, or even in a remote, digital memory.

The battery model may be updated from time to time using data resulting from measurements and provided, e.g., by the smart power monitor. For example, the parameters of a computational battery model may be modified from time to time, as noted above, to bring the predictions of the model back in line with the actual measured battery behavior.

Figure 5:
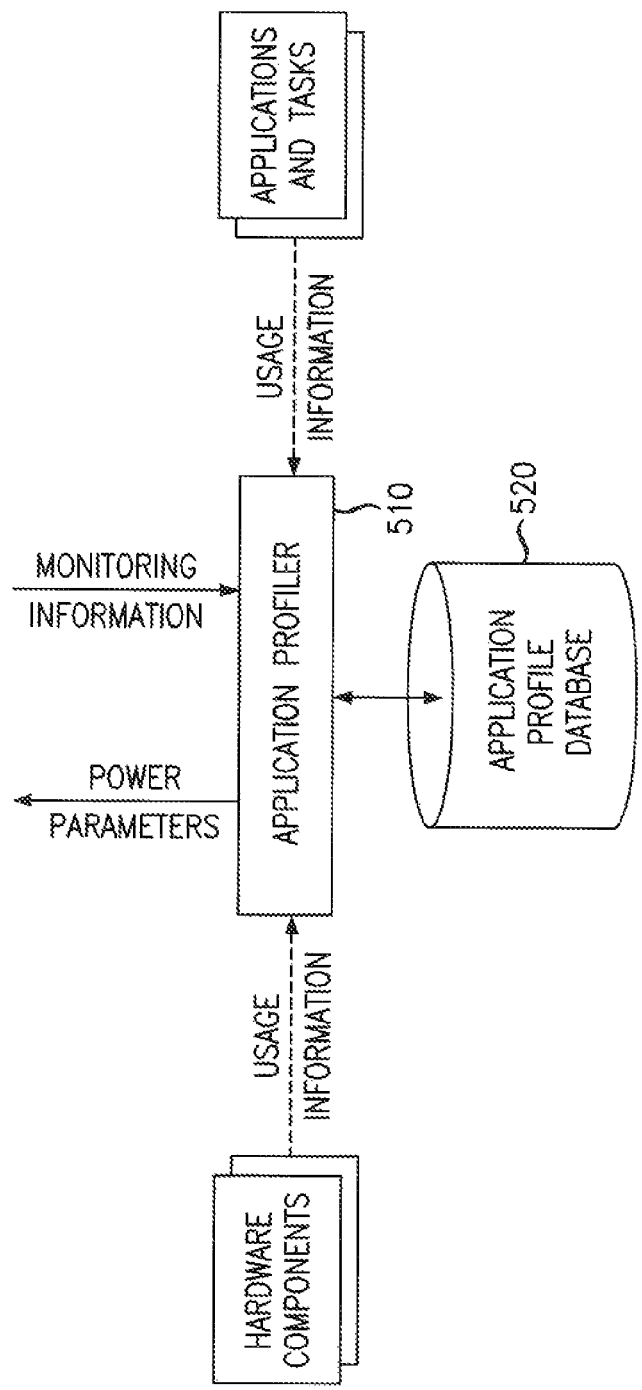
FIG. 5 is a functional block diagram of an application profiler and its environment according to an embodiment of an exemplary power-aware management scheme.

The application profiler provides local storage for various parameters that characterize the applications. A functional block diagram of the application profiler and its environment is provided in FIG. 5. As shown in the figure, application profiler 510 uses a local database 520. The database includes the following information about applications:

Application profiles indicate the type of application, the relative priority level of the application (including, e.g., whether the application is critical), what hardware subsystems and resources are needed to run the application, an initial estimate of the anticipated run-time and bandwidth needed (if any), and the application's execution profile as supplied by the vendor or the developer.

The application profile may also include an application power threshold (APT), which we define as the estimated power required to complete a given application from the start, plus the minimum power required for critical applications. As explained in detail below, an APT can be used in task admission control and task scheduling. The APT and other thresholds are provided and updated by the power-aware task monitor. They may be stored in the application profile database, and made available by copying them into a memory that is directly accessible by the power-aware task scheduler.

The respective priority levels of applications can also be specified in the application profile by defining priority classes, each containing one or more applications. Each priority level may be associated with a different requirement for remaining battery charge, below which the applications of that priority level will be suspended or terminated. Accordingly, relative priority levels (whether of individual applications or of priority classes) may have an effect when, for example, the ensemble of concurrently running tasks begin to compete for the remaining battery charge, and lowest-priority applications are dropped first as the remaining battery charge continues to fall.

In regard to applications that are marked as critical, their tasks may be permitted to override the selection process so that they are permitted to run irrespective of the remaining discharge capacity of the battery. Thus, for example, when the remaining effective charge falls below a threshold such as 20% of initial capacity, or if the remaining charge is predicted to fall below such a threshold before the next anticipated recharge of the battery, the mobile terminal may enter a mode in which only critical tasks are permitted to run. Optionally, a very low threshold, set e.g. at 1% to 5% of initial capacity, may be specified as a battery exhaustion threshold. The battery is deemed about to die when it drops below this threshold. Accordingly, no applications, not even critical applications, are admitted for scheduling, while active critical applications are gracefully terminated. On reaching the exhaustion threshold, the OS may generate an audible or visual warning to make the user aware that all critical applications are about to die.

Application usage statistics include the application's current state, the total run-time, the remaining time to complete, usage patterns, and historical data.

Application-specific hardware usage profiles identify the type of hardware subsystems that are required to run the application. For example, a profile may include the processor type and speed, the type and size of memory and storage, the display size and type. If may indicate the presence and activity of sensors, a camera, and a key pad. It may include information describing the transceiver and power amplification.

The database also provides an API through which the power-aware task monitor can obtain, for each application, an estimate of the total required power and the run-time. The application profile database provides the key parameters for the power-aware task monitor and the power-aware task scheduler.

The API may include, for example, a set of ready-to-use high-level functions that can be invoked by applications and operating system modules for retrieving information from the database. This is advantageous because it obviates the need for individual applications to add additional code to directly issue queries to the database.

The communication resource monitor is a module used to measure the channel quality of the wireless link. This module is described here with reference to FIG. 2, where it is represented by functional element 230. Measurements of the channel quality are used as a basis for setting the communication threshold parameter. Thus, for example, the power monitor may periodically invoke the communication resource monitor to measure the channel quality in terms of, e.g., uplink and downlink bandwidth, signal-to-interference-plus-noise ratio (SINR), and location. The location information can be used to estimate the distance between the mobile terminal and the nearest cell tower (or the nearest access point node) and to determine whether the current location is in an area receiving poor coverage (or no coverage).

The location of the mobile terminal can be obtained, e.g., using an integrated GPS or by network-based measurement from the cell tower. The power-aware task monitor uses the location information to set the required transmission power level. If the mobile terminal is located in a no-coverage area, the power-aware task monitor may use the location information to decide how often it should try to search for the network connectivity. If a suitable model of user mobility is provided so that, e.g., a target location can be predicted for the mobile terminal, it may be possible to improve such a decision by using knowledge of the velocity of the mobile terminal together with its location.

The power-aware task monitor is also more easily understood with further reference to FIG. 2, where this module is shown as functional element 240. Referring to FIG. 2, the power-aware task monitor is used to estimate various parameters that are needed as input to the power-aware task scheduler. The power-aware task monitor runs periodically to update the power and communication threshold parameters and the application profile. For making the parameter estimates, the power-aware task monitor obtains information from the application profile database, and it invokes the smart power monitor and the communication resource monitor.

The power-aware task monitor also updates the application profile database with information, including: How the long the task has been running, the amount of power already used by the task, the power required to complete the task, and application usage statistics. The power-aware task monitor may also collect information from power-dissipating functions. For example, it may obtain measurements, and use the measurements to set parameter values, that describe levels of processor activity, amounts of display usage, and amounts of usage of other hardware components. This information is useful, among other reasons, to check whether these levels of usage are in line with predictions and to update the application profiles. This information can also be used, e.g., to take action when the power consumption is much higher than anticipated, and when the battery state does not support further execution of the application.

There are various ways to estimate, during run-time, the amount of power required to run the application to completion. For example, there are known frameworks, i.e., programming environments that provide programming interfaces, in which energy-aware applications can be developed. Through such a programming interface, a user may be able to identify different execution paths, calculate the energy consumption associated with each path, and select an execution path according to the respective energy consumptions. For an initial estimate of the (average) energy consumption, execution profiles of the application identified during testing might be used. It will be understood, however, that such an approach may be of limited use in regard to interactive video games and other applications whose total run-time cannot be readily estimated.

Another estimation technique that is useful in this regard has been proposed for estimating the energy cost of applications running on a portable wireless device. According to such an approach, the device is divided into communication and computation components. Each component is modeled as a finite state machine for the purpose of computing the energy cost. Under this model, each state has an average current usage, and a duration of execution. The total energy cost of the application is computed by combining all state transitions and their respective estimated energy usages. The application developer can use such a model to provide an estimate of total energy consumed by the application.

It should be noted that if the power-aware task monitor were permitted to run too frequently, it might pose a danger of over-utilizing the processor. Therefore, it could be advantageous to limit the power-aware task monitor so that it runs less frequently than the power-aware task scheduler. For example, the power-aware task monitor may be set so that it will update application profile parameters only for those tasks that have run since the last update. The power-aware task monitor may further be set so that it will invoke the smart power monitor and the communication resource monitor at different intervals. The power-aware task monitor may provide, to the power-aware task scheduler, threshold settings for the scheduler to use for determining the initial admission of tasks and for controlling long-running tasks.

The power-aware task monitor could also be run at a lower priority, such that the processor capabilities, when they are needed in order for applications to be executed, are not adversely affected.

To keep track of the general power consumption of the mobile terminal, the task monitor reads power-related parameters such as the battery state, processor activity, memory activity, and the amount of data transmitted and received since the last monitoring phase, and writes the parameters to a memory location that is accessible by the power-aware task scheduler. The task monitor may also condition the pertinent parameters into a form that is useful for rapidly evaluating whether to admit or continue a task. That is, it is disadvantageous to rely on a lengthy evaluation process each time a decision is made whether to admit a task. Instead, it is preferable if parameters are readily provided that reflect the current state of the mobile, the current state of the application, and the power consumption of the active tasks, on the basis of which a rapid decision can be made.

Figure 6:
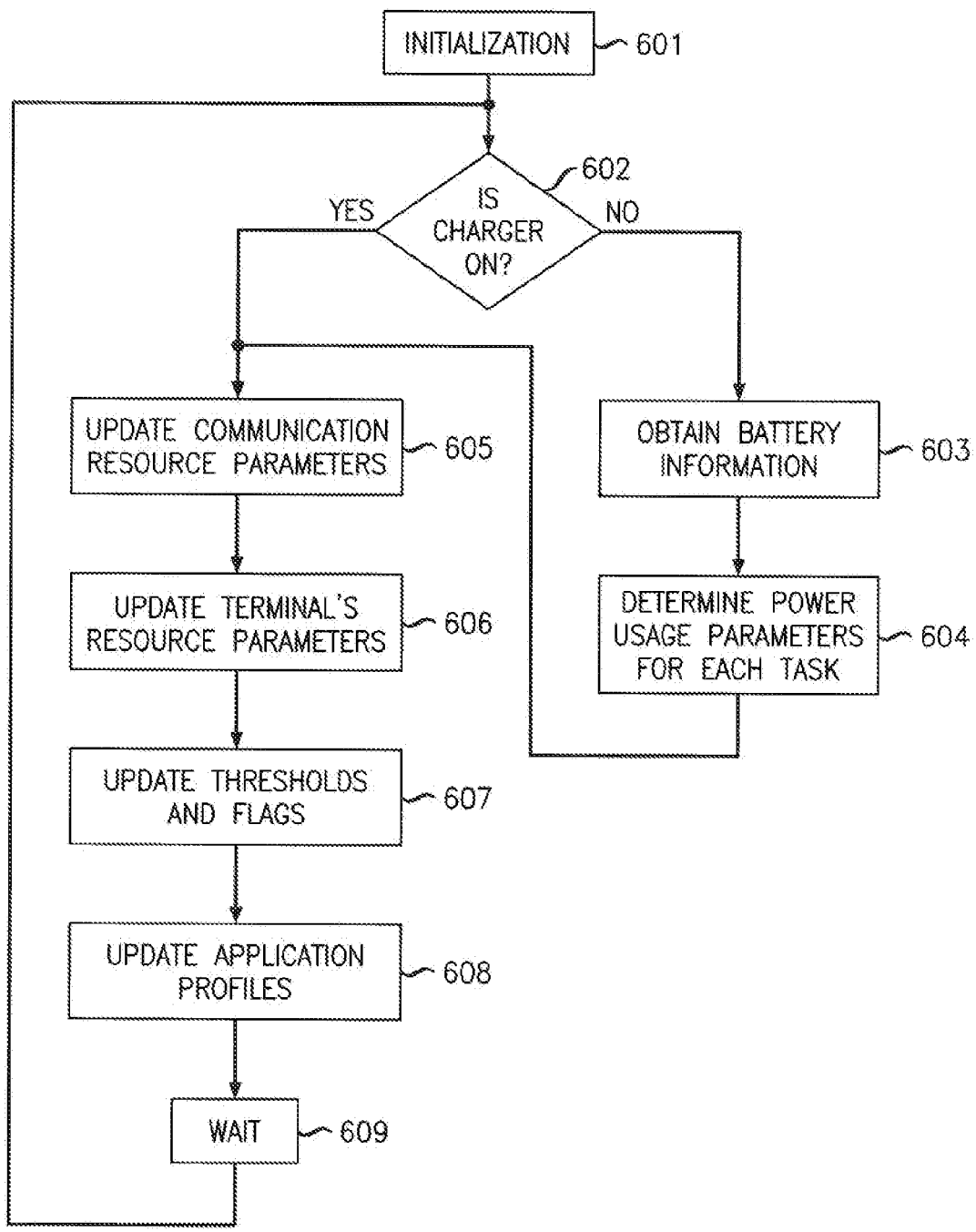
FIG. 6 is a flow diagram of an exemplary power-aware task monitor.

The flow diagram of an exemplary power-aware task monitor, corresponding to functional block 240 of FIG. 2, is shown in FIG. 6. It will aid comprehension of the following discussion if FIG. 6 and FIG. 2 are read together. The power-aware task scheduler takes a set of tasks that are waiting to be scheduled and obtains, for each such task, the parameters to be used by the power-aware task scheduler for determining whether to schedule the task for execution, to reject it, or to suspend it. Each processing step indicated by a block in the figure is carried out on a batch of admitted tasks obtained from the queue of active tasks illustrated in FIG. 2. The power-aware task monitor runs in exemplary implementations as an always-running background process such as a system daemon. The tasks being monitored include both new tasks and tasks that have returned to the power-aware task management system for another round of processing.

Initialization 601 takes place when the mobile terminal is powered on, or at other times when the system function needs to be restored. During initialization, the initial thresholds and flags, such as override flags, are set for each of the applications and/or tasks. In at least some implementations, it may be advantageous to set an override flag for all tasks if the power charger is determined (e.g., in block 602) to be on, indicating that an inexhaustible power supply is in current use, or if the user wishes to operate in a mode in which the power-aware features are disabled. In at least some implementations, setting the override flag for all tasks will cause all scheduling decisions to be made without, or irrespective of, a comparison of the projected energy usage to the remaining battery capacity.

Thus, some implementations may offer the user a choice between starting up in a conventional mode, or in a power-aware mode. If the user designates the conventional mode, the OS may, e.g., activate all override flags, so that no scheduling is based on power-aware scheduling decisions. By contrast, if the power-aware mode is designated, the OS may enable the power-aware task scheduler and the other power-aware modules.

If the charger is not on (e.g., if it is off or disconnected), the task monitor obtains, at block 603, the SoC, SoH, and other battery information from battery power monitor 210. At block 604, the task monitor determines the power usage parameters for each task. It should be noted that if the remaining discharge capacity of the battery is low, a power usage parameter indicating that a given task is projected to use a relatively large amount of power may provide a basis for immediate termination of the task.

After block 604, the task monitor proceeds to block 605, where updated communication resource parameters are obtained from communication resource monitor 230. Likewise, the task monitor proceeds to block 605 if, at block 602, it determines that the charger is on.

At block 606, the task monitor obtains updated parameters relating to various resources that affect the operation of the mobile terminal. These may include, for example, parameters indicating input-output (I/O) resources and other factors affecting power usage.

At block 607, the task monitor updates the thresholds to be used for applying the power-aware selection criteria, and it updates the flags for indicating, e.g., that the selection criteria should be overridden for certain tasks or classes of tasks or applications. It should be noted in this regard that by providing the power-aware task scheduler with a relatively small number of parameters indicative of the battery state, the projected energy usage of a given task, and the presence of any override flags, the task monitor enables the scheduler to make very fast decisions based on simple threshold comparisons.

At block 608, the task monitor obtains updated application profile parameters from application profiler 220.

Each of the update operations represented by blocks 605-608, respectively, may update its associated parameters at a different frequency. For example, each of the respective update operations may be associated with a counter that triggers an update operation and resets after a designated number of iterations of the control loop 602-609 illustrated in the figure. Such a designated number of iterations may be fixed, or it may be a dynamic value set, for example, by an adaptive algorithm.

It should be noted that the particular order shown for blocks 605 through 608 is merely illustrative and not limiting. Other possible arrangements are possible will be evident to those skilled in the art.

Block 609 represents a wait time that can be controlled to control the update frequencies for the various parameters. Each implementation will advantageously establish an appropriate tradeoff between high update frequency, which leads to a high computational burden, and low update frequency, which may lead to inaccurate control of energy usage. It should be noted in this regard that whereas the task scheduler will typically operate on a cycle time in the range of one or several milliseconds, the power-aware task monitor will typically operate on a much longer cycle time, which may, e.g., be in the range of seconds or even tens of seconds or even more.

We turn now to a more detailed discussion of the power-aware task scheduler. The power-aware task scheduler, shown as element 250 in FIG. 2, takes into account the application profile, channel quality, anticipated task duration, and other factors to determine the resources required for task completion and to project the impact on battery life. The power-aware task scheduler in the mobile terminal can reserve power for critical services such as emergency calls, health monitoring, authentication, and payment and banking applications.

As will be apparent from the discussion below, a power-aware task scheduler will typically make scheduling decisions based on an estimate of total energy required to complete a task. However, an explicit estimate of the total energy requirement may not need to be computed if, for example, the rate of energy consumption is taken into account together with the anticipated task duration. Accordingly, the energy consumption rate may, e.g., be compared with one or more thresholds, and the thresholds may be dependent upon other variables such as task duration.

It should also be noted that the estimates of consumption rate and total consumption may be various kinds of estimates, including without limitation estimates of peak values, average values, and probabilistic estimates.

The power-aware task scheduler may enforce the power reserve by denying admission to at least some applications if the remaining battery power falls below a threshold. Alternatively or additionally, it may enforce the power reserve by denying such admissions if the remaining battery power is expected to fall below a threshold prior to the anticipated time of the next recharge. In this regard, the anticipated time between recharges could, e.g., be preset to a default value such as twelve hours, or it could be user configured or determined adaptively.

Thus, for example, long video transmissions might be denied when the remaining battery power is below 20%, non-essential applications might be denied when the remaining battery power falls below 10%, and ordinary voice calls might be denied when the remaining battery power falls below 5%.

The power-aware task scheduler may utilize information provided not only by other modules within the mobile terminal, but also information provided by entities within the wireless network. For example, one or more servers within the network may provide information about the mobile terminal's battery power and application profile to the power-aware task scheduler. (In particular, a battery model may be implemented in such a server within the network.) In that way, the network can help to determine when and how to support power-intensive applications. The network may also provide the mobile terminal with location-based coverage information. For example, the network might be able to recognize that the user is currently in a radio shadow (due, e.g., to a building or an underpass). If a suitable mobility model is provided, for example, the network might be able to advise the mobile terminal that if it continues on its current path, it will soon enter an area of better coverage.

On the basis of such information, the mobile terminal and the network may adjust the communication strategy to reduce the power required for communication and processing in the mobile terminal.

One communication strategy that may be adjusted is the choice of media. For example, a choice might be made to transmit audio only, instead of making a full video transmission. Another adjustable strategy is the choice of quality of, e.g., an audio or video signal. Another adjustable strategy is the timing of a transmission. If current wireless channel quality is poor, power may be conserved by delaying an uplink transmission until the channel quality improves.

A strategy of delayed transmissions can conserve power in at least two respects: Acceptable throughput may require less transmission power and less processing power when channel conditions are good, and under good channel conditions, there may be less drain on the mobile terminal's battery due to repeated attempts to acquire uplink radio resources.

The power-aware task scheduler may also include functionality to allow better control over low-level power management control functions of the kinds that have been implemented in some current mobile terminals. Examples of such control functions are the dimming function that switches the display to a low-power mode, and the power-saving functions that can switch off the terminal's inactive components and place others, such as the transmitter and receiver, into intermittent sleep modes. Yet another control function may be dynamic voltage scaling of the processor itself.

It should be noted that the determination of whether sufficient capacity remains to complete a particular application may be based not only on the estimated power requirements and duration of the application in question, but also on the total rate of energy consumption of the existing tasks and processes. Such a determination may affect the admission of a task for scheduling, as well as the scheduling decision for the task.

In regard to power requirements, it will be recalled that we defined the application power threshold (APT) in the preceding discussion as the estimated power required to complete a given application from the start, plus the minimum power required for critical applications. This makes it possible to specify an amount of power to be held in reserve for the performance of critical applications.

The APT can also be defined as a percentage of available power in the battery. Different values of the APT can be set for different classes of applications and services. Accordingly, applications having different relative priorities can be given differential treatment, so that, for example, when the battery is low but not critically low, high-priority applications may be scheduled, while lower-priority applications may be rejected. When a task is to be rejected (or suspended), the operating system may execute a special software trap to produce corresponding messages to the user, and then eject the task from the scheduler.

For a new task, the APT will be the estimated power required to complete the entire application, plus the minimum power required for critical applications. For a returning task, by contrast, the APT will be the estimated power required to complete the remaining part of the application, plus the minimum power required for critical applications and the anticipated power dissipation of other admitted applications. When a task is scheduled to run, it either runs to completion and exits the system, or it returns for a next cycle of scheduling. It should be noted that the actual implementation of the power-aware task scheduler may be dictated by the properties of the specific host operating system, among other considerations.

The scheduler may send the user a warning message if it determines that it is not advisable to run the task because, for example, the battery power is below the minimum threshold or the communication resources are below the required threshold. The user may then decide to bypass the power-aware part of the scheduler and force the mobile to perform the task.

Figure 7:
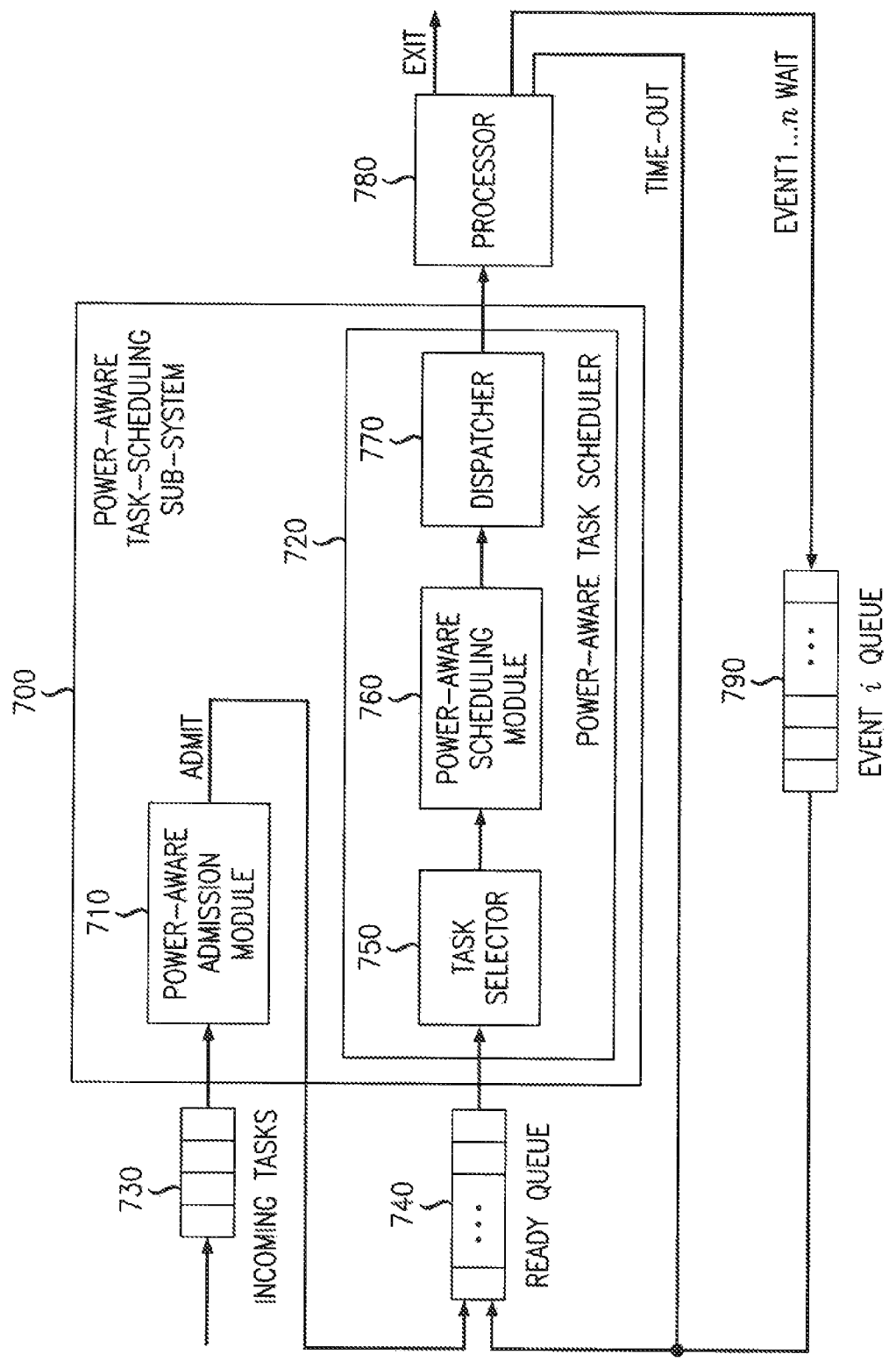
FIG. 7 is a functional block diagram of an exemplary architecture for implementing a power-aware task scheduler.

FIG. 7 provides a functional block diagram of one possible architecture for implementing a power-aware task scheduler. FIG. 7 will be discussed in greater detail below. Meanwhile, FIG. 8A is most easily understood if read in conjunction with FIG. 7.

Figure 8A:
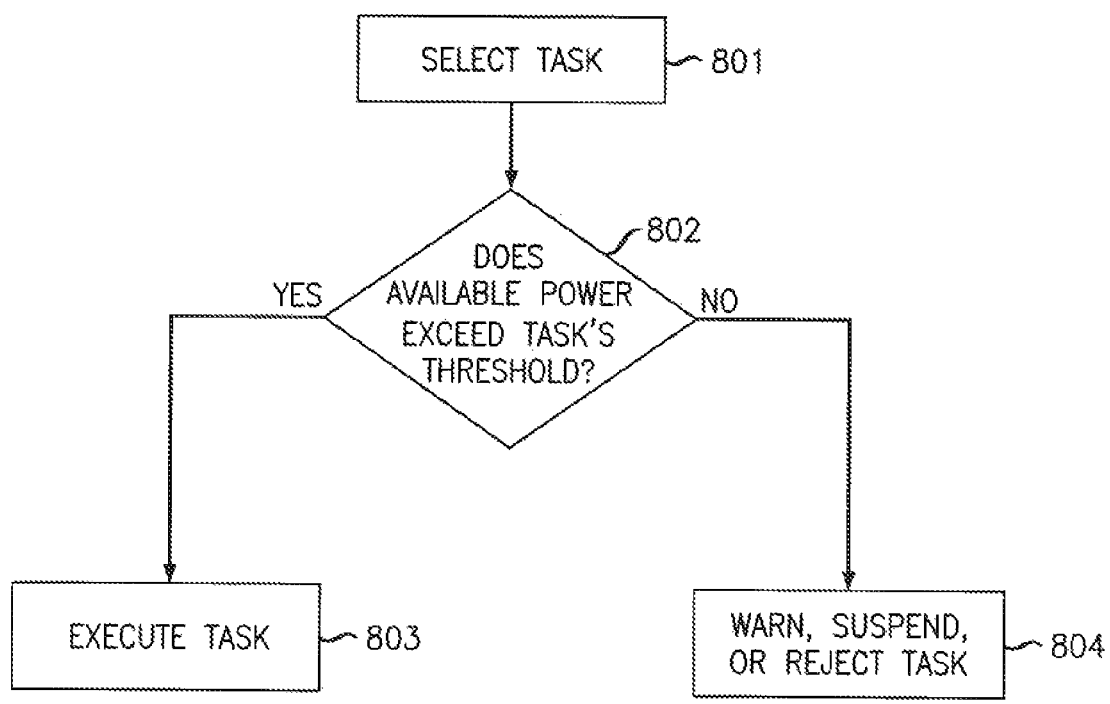
FIG. 8A is a high level flow diagram illustrating a scheduling or admission decision based on a power threshold for a task.

Turning now to FIG. 8A, shown there is a high level flow diagram illustrating a scheduling or admission decision based on a power threshold for a task. This is one feature that may be implemented in the admission module as well as in the power-aware task scheduler. As noted above, the power threshold may apply to tasks generally, it may be different for different classes of applications or tasks, or it may be specifically configured for individual tasks or applications. One benefit of the enforcement of power thresholds is that such a practice can cause power to be held in reserve for tasks that are designated as critical. Accordingly, the critical tasks may be admitted and executed without imposing any threshold, or they may be subjected to, e.g., a very low threshold so that they will be rejected only when total exhaustion of the battery is imminent.

As seen in the figure, a task is selected at block 801 from a queue, such as incoming task queue 730 or ready queue 740, both of which are shown in FIG. 7 and discussed below. At block 802, the admission module or scheduling module determines whether the available battery power is greater than the applicable threshold. If there is sufficient available power, the task is admitted or scheduled for execution, as illustrated by block 803. Otherwise, the admission module will reject the task, or the scheduling module will issue a warning, or suspend or reject the task as indicated at block 804.

FIG. 8B is a format diagram for an exemplary process control block 810. As is well-known to those skilled in the art, process control blocks provide operating systems with the task-specific information that they need for task scheduling. Process control blocks are the basic units of information that are processed in the admission module and the power-aware scheduling module discussed below in connection with FIGS. 9A and 9B, respectively.

The process control block of FIG. 8B has been modified, relative to more conventional process control blocks, to include power-related data fields. That is, the power-control block shown in the figure includes conventional process elements such as identifier, state, priority, program counter, memory pointers, context data, I/O status information, and accounting information. However, it also contains additional process elements such as power-related flags, and power-related information. The power-related flags may include, for example, the override flags discussed above. Power-related information may include the power thresholds discussed above, as well as other application profile parameters as provided, e.g., by power-aware task monitor 240 of FIG. 2.

Figure 9A:
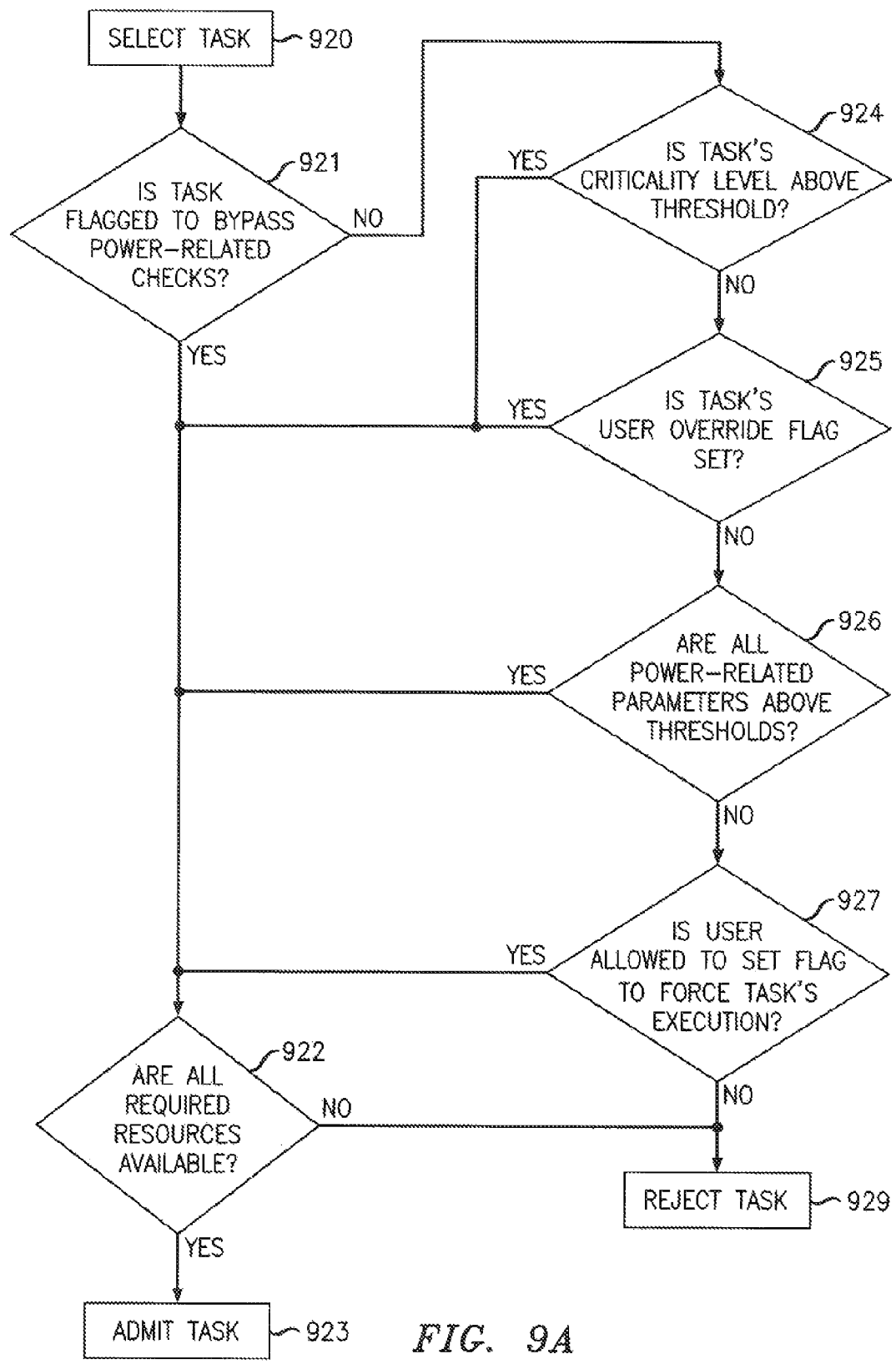
FIGS. 9A and 9B are flow diagrams illustrating the operation of functionalities within power-aware task scheduling subsystem 700 of FIG. 7 in an illustrative embodiment. More specifically.
Figure 9B:
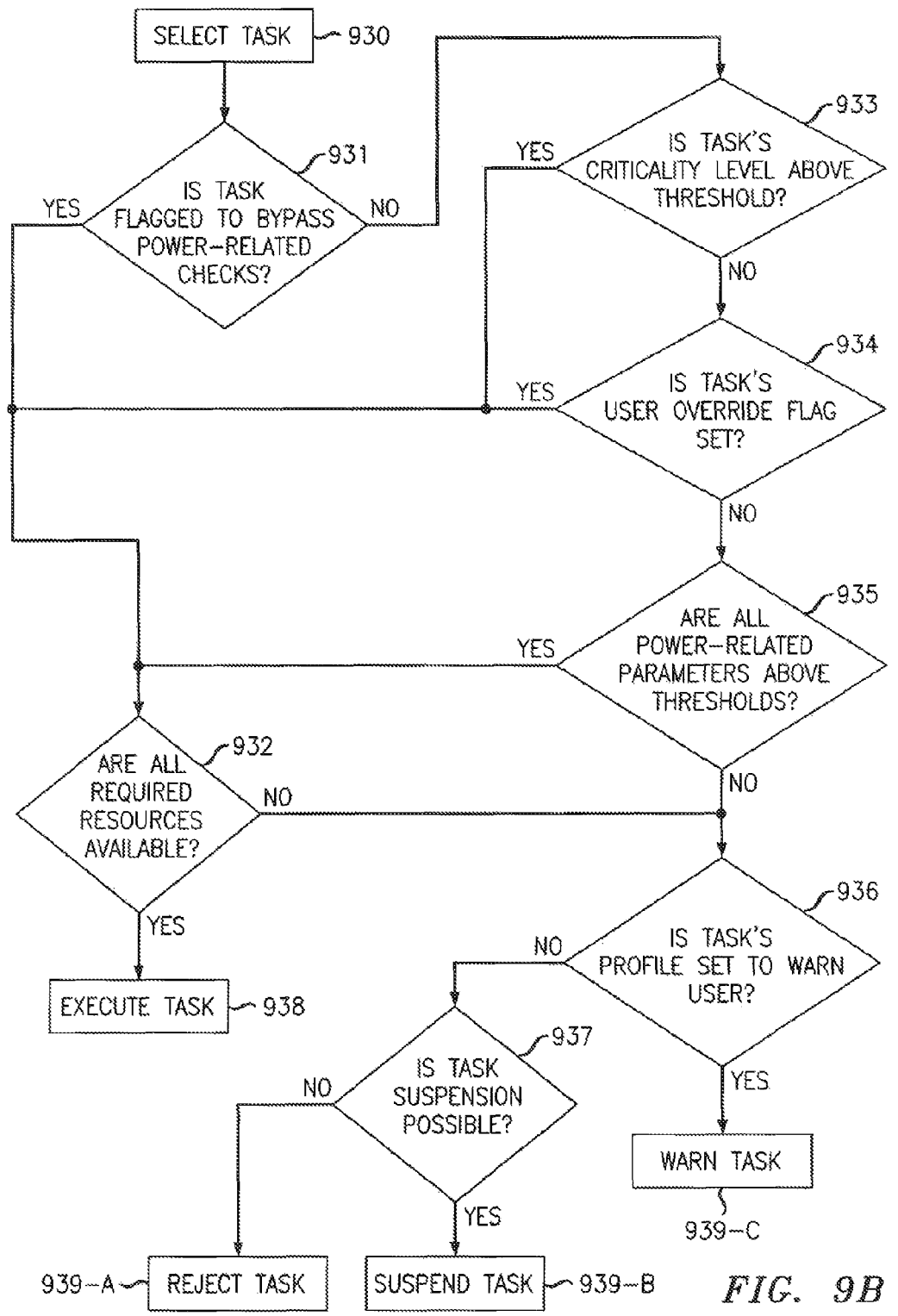

We turn now to FIGS. 9A and 9B, which are flow diagrams illustrating the operation of functionalities within an illustrative power-aware task scheduling subsystem. The scheduling subsystem includes an admission module whose operation is described by FIG. 9A, and a power-aware scheduling module whose operation is described by FIG. 9B. FIGS. 9A and 9B are best understood in conjunction with the block diagram of FIG. 7, where power-aware task scheduling subsystem 700 is shown as including power-aware admission module 710 and power-aware task scheduler 720. The task scheduler, in turn, includes task selector 750, and power-aware scheduling module 760. Further details of FIG. 7 will be discussed below.

Turning now to FIG. 9A, the admission module first selects 920 a task from a queue, such as incoming tasks queue 730 of FIG. 7. The admission module checks 921 whether the task bypass flag (TBF) has been set, indicating that the task is permitted to bypass power-related decision points. The TBF is a flag that may be configured in advance for, e.g., system tasks as well as for other specified tasks. It should be noted in this regard that the various flags referred to here may be treated as individual binary-valued parameters, or they may be grouped into one or more multi-valued parameters.

If the TBF has been set, the admission module checks 922 whether all resources required for the task to be executed, such as resources at the mobile terminal and communication resources, are available. If so, the task is admitted 923. Otherwise, it is rejected 929.

Returning to decision point 921, if the task has not been flagged to bypass power-related decision points, the admission module checks 924 the priority or criticality level of the task. If the priority or criticality level is high enough to bypass power-related decision points, the admission module proceeds to the resource check at decision point 922. Otherwise, the admission module checks 925 whether a user override flag (UOF) has been set. Typically, the user will set the UOF in response to a warning issued by the power-aware task scheduler, as will be described below.

If the UOF has been set, the admission module proceeds to decision point 922. Otherwise, the admission module checks 926 whether the battery has sufficient remaining discharge capacity to satisfy all of the selection criteria based on power thresholds. If so, the admission module proceeds to decision point 922. Otherwise, the admission module checks 927 whether the request-override (RQO) flag has been set. When RQO is set (e.g., when it has the binary value RQO=1), the user will be permitted to force the execution of the task by manually setting UOF, subsequent to the admission of the task, when the user is warned by the power-aware task scheduler. If RQO has been set, the admission module proceeds to decision point 922. Otherwise, the task is rejected 929.

Turning now to FIG. 9B, a scheduler, such as scheduler 760 of FIG. 7, first selects an admitted task from a queue such as ready queue 740. As shown in FIG. 7, this may be done with the aid of task selector 750. The scheduler checks 931 whether TBF has been set, i.e., whether the task has been flagged to bypass the power-related decision points. If so, the scheduler checks 932 whether all resources required for the execution of the task are available. If so, the task is scheduled for execution and executed 938. Otherwise, the scheduler proceeds to decision point 936, which will be discussed below. Here we note that the possible outcomes of decision point 936 are rejection or suspension of the task, or issuance of a warning to the user. The consequence of warning 939C will be discussed in greater detail below.

Returning to decision point 931, if the scheduler determines that TBF has not been set, i.e., that the task has not been flagged to bypass power-related decision points, the scheduler proceeds to decision point 933, where it checks the priority or criticality level of the task. If the priority or criticality level is high enough to bypass power-related decision points, the scheduler proceeds to the resource check at decision point 932. Otherwise, the scheduler checks 934 whether the user-configured override flag UOF has been set. If so, the scheduler proceeds to decision point 932. Otherwise, the scheduler checks 935 whether the battery has sufficient remaining discharge capacity to satisfy all of the selection criteria based on power thresholds. If so, the scheduler proceeds to decision point 932. Otherwise, the scheduler proceeds to decision point 936.

As noted above, the scheduler may enter decision point 936 from decision point 932, as well as from decision point 935. Having reached decision point 936, the scheduler checks whether RQO has been set. If RQO has been set, the scheduler is enabled to issue a low-power warning to the user and to receive manual input from the user which will result in the setting of UOF (i.e., setting UOF=1) if the user indicates a desire to force the execution of the task. Although not explicitly shown in the figure, warnings may of course also be issued in the event that the task is about to be suspended or rejected.

Accordingly, if RQO has been set, the scheduler causes 939C a warning to be issued. Although not explicitly shown in the figure, the scheduler also places the task into a wait queue for the admission module of FIG. 9A. In the next cycle of admission processing, and after the task monitor has reported on flag values including the user-configured value of RQO, the admission module will read RQO at decision point 927, with consequences as explained above.

If RQO has not been set, the scheduler checks 937 to determine whether the task can be suspended. If so, the scheduler causes 939B the task to be suspended. Otherwise, the scheduler causes 939A the task to be rejected. It should be noted in this regard that a suspended task can automatically return to the queue for another scheduling attempt, whereas a rejected task is permanently removed from the queue. For example, when available power and other conditions return to a level that satisfies the selection criteria (as indicated, e.g., by the power monitor as a result of periodic checks), suspended tasks may be automatically reactivated if they have not already been timed out.

It should also be noted that tasks processed by the scheduler include newly admitted tasks, as well as tasks that have returned for a further round of processing. The selection of each task from the ready queue so that it can be considered for a power-aware scheduling decision may be made using, e.g., features of a conventional scheduling algorithm.

We will now provide further details of how power-aware task scheduling may be implemented in a multi-tasking mobile operating system.

One exemplary architecture of a power-aware task scheduler in a multi-tasking mobile operating system is shown in the functional block diagram of FIG. 7. In the architecture that is illustrated, a power-aware task-scheduling subsystem 700 includes a power-aware task admission module 710 and a power-aware task scheduler 720. Scheduler functional block 720 corresponds to scheduler functional block 250 of FIG. 2.

The power-aware task admission module acts as a gatekeeper; that is, it is effectively a long-term scheduler that admits applications based on their criticality and power requirements. This module is invoked whenever a new task is started, either by the user or by the operating system. It determines which tasks are admitted for execution by using various criteria, including power consumption criteria as previously discussed. If more than one new task arrives simultaneously at the input, the task admission module may, e.g., employ a simple first-in, first-out (FIFO) scheme to select tasks for admission decisions. If an incoming task from incoming queue 730 is admitted for execution, it will be placed in the ready queue 740 for further scheduling by the power-aware task scheduler 720.

An exemplary power-aware task scheduler includes a task selector 750 of a conventional kind, to which is added a power-aware scheduling module 760. Module 760 provides short-term task scheduling, which aims to efficiently allocate processor time to tasks that are in the ready queue. Tasks in the ready queue include not only those that are newly admitted, but also tasks that have returned from a previous schedule cycle after an input/output (I/O) operation, those from a critical section, those swapped-in to the main memory, or those from interrupts.

In this regard, a "critical section" is a segment of a program that has access to a shared memory area, a common file, a common variable, or some other common resource. If one task is executing in a critical section, no other task will normally be permitted to execute in it. Thus, the operating system acts as a gatekeeper to allow only one task to have access to the critical section at a given time.

"Swapping" is an operation that the operating system (OS) may perform when the main memory has limited available space. Accordingly, the OS may swap an existing (but not running) process out of the main memory and into a secondary storage such as a hard disk, or to an extended slow RAM memory, to make room for newly arriving processes. Swapping in will happen when the OS brings a swapped-out process back into memory for a further round of execution.

Task selection can be accomplished using any of various known algorithms, such as first-in-first-served (FIFS), shortest-job first (SJF), shortest-remaining time-first (i.e., SRTF, which is a variant of the preemptive SJF algorithm), round robin, priority-based, multi-level queues, multi-level feedback queues, or any specialized algorithm. Some operating systems employ a combination of these algorithms.

If the power-aware scheduling module decides to schedule the task for execution, the task will be handed over to dispatcher 770. The role of the dispatcher is to provide the selected task with control of the processor for a specified duration called a quantum or time slice. The processor time quantum in multi-tasking operating systems is usually set in multiples of 10 milliseconds (10 ms). For example, the time quantum in the Linux operating system varies from 10 ms to 200 ms. During this quantum, the task either runs to completion, or else it transitions to a waiting state before returning again to the ready queue.

At the end of the task selection process, the power-aware task selector 750 will check whether the currently selected task has been running for a long time. This duration may be specified, for example, in terms of the number of times the application has cycled through the task scheduler 720. Such checking of the run duration may be advantageous, for example, when it is desirable to consider the drain rate of the battery in view not only of the given application, but also of all the other tasks that are running. If the total drain rate becomes relatively high, it may be desirable to reassess whether the given application should be permitted to continue running. Such reassessment may be made in view of the priority level of the given application and in view of the priority levels of other applications that may be running.

As illustrated in FIG. 7, power-aware task scheduler 720 integrates the functionalities of a conventional task scheduler with the new, power-aware features that are described here. In other implementations, a conventional task scheduler and a power-aware task scheduler may operate as distinct entities in, e.g., a parallel or serial arrangement.

In one possible parallel arrangement (not shown), ready queue 740 and dispatcher 770 serve both the conventional and the power-aware scheduler, and task selector 750 is used to direct different classes of tasks to the different schedulers. For example, the task selector may direct OS tasks to the conventional scheduler and user tasks to the power-aware scheduler.

Alternatively, each of the respective schedulers may have its own ready queue and task selector.

In one possible serial arrangement (not shown), the power-aware task scheduler is the first scheduler in sequence, and it is followed by the conventional task scheduler. The power-aware scheduler operates only on, e.g., the user tasks, and simply passes the OS tasks forward to the conventional scheduler. The conventional scheduler does not operate on tasks suspended or rejected by the power-aware scheduler, but simply passes them forward to the dispatcher (which may, e.g., be incorporated as a component of the conventional scheduler). By contrast, tasks in regard to which a warning has been issued are processed by the conventional scheduler. In alternative arrangements, the power-aware task scheduler may be the second scheduler in sequence, preceded by the conventional task scheduler.

The decision whether to schedule a task for execution is based on the task's criticality, as identified by the application type, its execution time, the amount of power needed to complete the task, and the communication thresholds for that task. The rate of power consumption may also be significant, for example when the execution time is difficult to predict. In a case where the task cannot be scheduled for further execution, the OS may warn the user that the task has been suspended or rejected. The OS may allow the user to override the power-aware scheduling decision, e.g., by setting an override flag, as mentioned previously.

Because it is typical for the processor to switch between tasks every few milliseconds, it is possible that the power-aware task scheduler may be called upon to make complex re-evaluations on returning tasks hundreds of times per second, or even more. Therefore, to avoid undue expenditure of time and power on such re-evaluations, it is desirable to operate the power-aware task scheduler with the highest possible efficiency. The efficiency of the power-aware scheduler can be maintained if the process by which it makes decisions is limited to a few comparison operations on threshold values that have already been computed by the power-aware task monitor. It should be noted in this regard that if the battery charge level is so low that only critical applications are allowed, non-essential task monitoring and scheduling functionality may advantageously be reduced or even switched off.

With further reference to FIG. 7, it will be seen that task processing in processor 780 may have various outcomes. If the task has been completed, it will exit from the processing loop, as shown in the figure. As is well-known in the art, a task may time out if it reaches its maximum allotted processing time without reaching completion. In such an event, the task will typically cycle back through the processing loop, as shown. Some tasks may need to enter a wait state until a trigger is received, indicating that a condition necessary for further processing has been satisfied.

Multiple queues may be established, in which each queue represents tasks that are waiting for an event particular to that queue. When the event occurs, the tasks waiting in that queue may return to the ready queue. Shown in the figure is one representative queue labeled "EVENT 1-n WAIT," to indicate that there may in fact be as many as n separate queues. In other words, the queue shown in the figure is the ith queue, where i=1, . . . , n. A triggering event may, for example, be the activation of a display, or the establishment of a wireless connection.

We now turn to two particular use cases involving the principles describe here. The first protects critical applications, and the second protects network connectivity in the presence of fluctuating network conditions.

Use Case 1: Critical Terminal-Centric Services.

An application might be designated as critical by the user or the service provider, or for example it might be government-mandated as a critical application. We expect that mobile terminals will increasingly be used to perform critical applications that involve authentication and security. For example, where enhanced 911 service is a government-mandated emergency service, ensuring a power reserve for its possible use may be a critical requirement. In further examples, specialized biometric sensors are now being integrated into certain handsets for authentication purposes, and we expect that such authentication-related sensors will become standard components of handsets in the future.

Above, we defined the application power threshold (APT) as the estimated power required to complete a given application from the start, plus a minimum power required for critical applications. The purpose was to specify an amount of power to be held in reserve for the performance of critical applications.

Here, we note further that the TPM module can be configured to reserve a portion of the mobile terminal's battery capacity so that it is dependably available for critical functions, including enhanced 911 service and authentication functions that rely on biometric sensors, among others. The TPM module can effectuate such a power reserve, for example, by blocking or suspending non-essential applications if a specified threshold has been exceeded. Such blocking or suspension would typically be additional to the admission control based on APT that we described earlier.

Desirably, part of the TPM module's functionality is to assure that all components needed for critical transactions are available and fully operational when needed. Thus, for example, the TPM should be able to override power-saving features such as display control when necessary.

Use Case 2: Non-Critical Network-Centric Applications

The user of a mobile terminal might want, e.g., to listen to a podcast or to download content from a network-centric server for some other purpose. In addition, the mobile terminal itself might decide to download content, e.g., to update local information, maps, advertisements, or software patches. Some of the content may be time-critical, whereas other content may not be time-critical.

If a user is moving, reception quality is likely to change significantly. For example, a mobile terminal may move from a high-quality reception area to a poor-quality area and vice versa, causing continual fluctuations in the reception quality. One consequence may be that the application experiences frequent outages or periods of bad reception.

High error rates due to poor reception will typically cause communication links to time out. By using power-aware task managers in the mobile terminal, the network, and the application server, however, an alternative may be provided that can avoid or at least reduce the incidence of such time-outs.

That is, time-outs due to poor channel quality are typically declared at a lower protocol layer, as is well known, for example, in regard to the TCP/IP layer. However, at the (higher) application layer, the network and the mobile terminal can adapt to the poor channel conditions in a manner that reduces the frequency of time-outs. For example, the application can reduce its data exchange rate, or change some other strategy. To be effective, such an adaptive approach would require collaboration among the power-aware task managers at the mobile terminal, at the network level, and at the application server.

In an illustrative scenario, the power-aware task monitor sets task-related parameters according to the current channel conditions, and the power-aware task scheduler suspends and resumes the task based on the availability of resources. For example, the power-aware task monitor might alter the priority of a task, causing it to be suspended intermittently or causing it to be scheduled at less frequent intervals. In such a manner, throughput associated with the task may be reduced during periods of poor reception, resulting in fewer time-outs during such periods.

In particular, it may be possible to perform downloads at high rates during periods when reception quality is good, while placing the communication modules into semi-sleep modes to minimize power consumption for the application during periods of poor reception quality.

Various measures are known for evaluating the channel quality. These include measures of throughput, signal-to-interference-and-noise ratio (SINR), frame error rates, and transmission power levels.

What is claimed is:

1. In a mobile communication terminal configured to support a plurality of applications, wherein each application is executed by performing one or more tasks, a method comprising:
   in response to a scheduling request from an application, obtaining an indication of power supply condition at a requested run-time of at least one of the tasks, wherein the indicated power supply condition comprises an estimate of remaining discharge capacity;
   obtaining a prediction of a rate of energy usage by the task at the requested run-time;
   estimating, from the predicted rate of energy usage, a total amount of energy needed to complete the task;
   making a scheduling decision for the task, wherein the scheduling decision comprises making a selection from a group of two or more alternative dispositions for the task, the selection is made according to a selection criterion that relates the run-time power-supply condition to the predicted rate of energy usage by the task and to the estimate of total energy needed to complete the task, and the selection criterion is based on whether the estimated remaining discharge capability exceeds, by at least a threshold amount, the estimated total energy needed to complete the task;
   iteratively updating the predicted rate of energy usage and the estimate of total energy needed to complete the task while the task is in progress;
   iteratively updating the estimated remaining discharge capacity and the threshold amount while the task is in progress; and
   making further scheduling decisions for the task, based on the updated rate predictions and energy estimates and on the updated estimates of remaining discharge capacity and of the threshold amount.

2. The method of claim 1, wherein the estimated total energy needed to complete the task is at least partly based on information retrieved from an application profile stored in a database.

3. The method of claim 1, wherein at least some applications have different respective priority levels, and wherein the threshold amount depends on the priority level of the application to which the task belongs.

4. The method of claim 1, wherein:
   the method further comprises determining whether the application making a scheduling request has a critical priority level;
   the steps of obtaining an indication of power supply condition, obtaining a prediction of a rate of energy usage, and making a scheduling decision are performed on condition that the priority level is not critical; and
   if the priority level is critical, the task is scheduled unconditionally.

5. The method of claim 1, wherein scheduling decisions are made for a plurality of tasks, and wherein for at least one priority level, tasks are scheduled for execution irrespective of any criterion that relates the run-time power-supply condition to the predicted rate of energy usage by the task.

6. The method of claim 5, wherein tasks are scheduled for execution irrespective of any said criterion if the priority level is at least one of: an indication that the task is critical, and a user-configured override indication.

7. A mobile communication terminal, comprising:
   a battery;
   a source of information about the condition of the battery;
   a first module configured to obtain an indication of the battery condition from the battery information source in response to a request from an application to schedule a task, wherein the indicated battery condition comprises an estimate of remaining discharge capacity;
   an energy-usage information source about the rates of energy usage by tasks associated with one or more applications;
   a second module configured to obtain, from the energy-usage information source, a prediction of a rate of energy usage by the task at a requested run-time for the task and further configured to update said prediction iteratively while the task is in progress, and further configured to estimate a total amount of energy needed to complete the task and to iteratively update said estimate while the task is in progress; and
   a task-scheduling module configured to select from a group of two or more alternative dispositions for the task, wherein the selection is made according to a selection criterion that relates the run-time battery condition to the predicted rate of energy usage by the task and to the estimate of total energy needed to complete the task, and the selection criterion is based on whether the estimated remaining discharge capacity exceeds, by at least a threshold amount, the estimated total energy needed to complete the task.

8. The mobile communication terminal of claim 7, further comprising an application profile database stored in a digital memory, and wherein the energy-usage prediction model is configured to retrieve information from the application profile database on which to base the estimate of total energy needed to complete the task.

9. The mobile communication terminal of claim 8, wherein the application profile database includes indications of different priority levels for different applications.

10. The mobile communication terminal of claim 9, wherein task-scheduling module is further configured such that the selection criterion is dependent on the priority level of the application making the scheduling request.

11. The mobile communication terminal of claim 10, wherein the task scheduling module is further configured to schedule any task that belongs to an application having a critical priority level.

12. The mobile communication terminal of claim 10, wherein:
   the threshold amount depends on the priority level of the application making the scheduling request.

13. The mobile communication terminal of claim 9, further comprising a task-selection module configured to decide whether to forward the task to the task-scheduling module, wherein the forwarding decision depends on the indication of battery condition and on the priority level of the application making the scheduling request.

14. The mobile communication terminal of claim 13, wherein the task selection module is further configured to forward, to the task-scheduling module, any task that belongs to an application having a critical priority level.

15. The mobile communication terminal of claim 13, wherein:
the task-selection module is further configured such that the forwarding decision depends on whether said estimated capacity exceeds the estimated total energy needed to complete the task by at least a threshold amount; and
the threshold amount depends on the priority level of the application making the scheduling request.

16. In a mobile communication terminal powered by a battery and configured to support a plurality of applications, wherein each application is executed by performing one or more tasks, a method comprising:
in response to a scheduling request from an application, obtaining an indication of remaining useful discharge capacity of the battery at a requested run-time of at least one of the tasks;
estimating, from a predicted rate of energy usage, a total amount of energy needed to complete the task;
obtaining an indication of whether or not the task is critical;
making a scheduling decision for the task, wherein the making of the scheduling decision comprises selecting from a group of two or more alternative dispositions for the task including at least one disposition that results in the task being disallowed and at least one disposition that results in the task being executed, the selection is made according to a selection criterion that relates the indication of remaining useful discharge capacity of the battery to the estimate of total energy needed to complete the task, and the selection criterion is based on whether the remaining useful discharge capacity of the battery exceeds, by at least a threshold amount, the estimated total energy needed to complete the task;
iteratively updating the estimate of total energy needed to complete the task while the task is in progress;
iteratively updating the indication of remaining useful discharge capacity of the battery while the task is in progress; and
making further scheduling decisions for the task based on the updated estimate of total energy needed to complete the task, the updated indication of remaining useful discharge capacity of the battery, and the threshold amount,
wherein the selecting step is performed such that for indications that the remaining useful discharge capacity is within a specified range, a disposition that results in the task being executed is available if the task is indicated as critical, but is otherwise unavailable.

17. The method of claim 16, wherein the range is below a specified threshold.

18. The method of claim 17, further comprising obtaining a value for the specified threshold that pertains to the requested task.

\* \* \* \* \*